United States Patent
Hori et al.

(10) Patent No.: US 8,001,393 B2
(45) Date of Patent: *Aug. 16, 2011

(54) STORAGE CONTROL DEVICE

(75) Inventors: Masanori Hori, Odawara (JP); Kiyoshi Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 820 days.

This patent is subject to a terminal disclaimer.

(21) Appl. No.: 12/007,227

(22) Filed: Jan. 8, 2008

(65) Prior Publication Data

US 2008/0201593 A1 Aug. 21, 2008

(30) Foreign Application Priority Data

Feb. 16, 2007 (JP) .................................. 2007-036301

(51) Int. Cl.
*G06F 1/00* (2006.01)

(52) U.S. Cl. ........ 713/300; 713/310; 713/323; 713/324; 713/330; 710/316

(58) Field of Classification Search .................. 713/300, 713/310, 320, 323, 324, 330; 710/317, 316; 711/114

See application file for complete search history.

(56) References Cited

U.S. PATENT DOCUMENTS

| | | | |
|---|---|---|---|
| 5,768,551 A * | 6/1998 | Bleiweiss et al. | 710/316 |
| 6,058,288 A * | 5/2000 | Reed et al. | 455/3.06 |
| 6,356,984 B1 * | 3/2002 | Day et al. | 711/147 |
| 6,583,947 B1 | 6/2003 | Hakamata et al. | |
| 6,603,323 B1 * | 8/2003 | Miller et al. | 324/754 |
| 6,948,012 B1 * | 9/2005 | Valin et al. | 710/38 |
| 6,950,263 B2 | 9/2005 | Suzuki et al. | |
| 7,032,062 B2 * | 4/2006 | Aruga | 710/316 |
| 7,035,206 B2 * | 4/2006 | Brewer et al. | 370/222 |
| 7,080,201 B2 | 7/2006 | Suzuki et al. | |
| 7,370,149 B2 * | 5/2008 | Suzuki et al. | 711/114 |
| 7,594,134 B1 * | 9/2009 | Coatney et al. | 714/3 |
| 7,639,493 B2 * | 12/2009 | Hori et al. | 361/679.4 |
| 2001/0011357 A1 * | 8/2001 | Mori | 714/25 |
| 2004/0153914 A1 * | 8/2004 | El-Batal | 714/724 |
| 2005/0207414 A1 * | 9/2005 | Duvvury | 370/389 |

(Continued)

FOREIGN PATENT DOCUMENTS

JP 2000-293314 4/1999

(Continued)

OTHER PUBLICATIONS

IBM. IBM Power 795: Technical Overview and Introduction. Nov. 2010.*

(Continued)

*Primary Examiner* — Matthew D Spittle
(74) *Attorney, Agent, or Firm* — Volpe and Koenig, P.C.

(57) ABSTRACT

The storage control device of the present invention reduces the power consumption amount by stopping the transmission of power to enclosures that are not accessed. A plurality of additional enclosures are switch-connected via backend switches to a base enclosure. Drives that have not been accessed for a predetermined time or more undergo spin-down. When all of the drives in the enclosure enter a spin-down state, the supply of power from the power supply in the enclosure to the respective drives is stopped. The base enclosure that manages the system constitution of the storage control device turns OFF the switch connected to the enclosure when all of the drives in a certain enclosure have spun down. The transmission of power to this enclosure is accordingly stopped.

15 Claims, 33 Drawing Sheets

U.S. PATENT DOCUMENTS

2006/0193073 A1    8/2006   Hakamata et al.
2006/0236028 A1*  10/2006   Tanaka et al. ................ 711/112
2008/0204920 A1    8/2008   Muramatsu et al.

FOREIGN PATENT DOCUMENTS

JP       2001-339853      5/2000

OTHER PUBLICATIONS

Xyratex. Reducing Storage Power Consumption. Sep. 2008.*
Naegel et al. Green Data Center Storage. Part II. Sep. 24, 2007.*
Office Action from Chinese Patent Office dated May 22, 2009 in Japanese.

* cited by examiner

FIG. 14

| | | | | | T1 |
|---|---|---|---|---|---|
| VOLUME MANAGEMENT TABLE | | | | | |
| I11 | I12 | I13 | I14 | I15 | I16 |
| LU# | CAPACITY | RAID GROUP # | RAID LEVEL | RIVE #LIST | LATEST ACCESS TIME |
| LU#0 | 200MB | RG01 | RAID5 | HDD01,02,03,04 | 2006/09/25 12:00:00 |
| ... | ... | ... | ... | ... | ... |

POWER SUPPLY STATE MANAGEMENT TABLE

| ENCLOSURE # (121) | STATE OF POWER SUPPLY TO ENCLOSURE (122) | DRIVE # (123) | SPIN STATE (124) | FIRST PDB SW # (125) | SW STATE (126) | SECOND PDB SW # (127) | SW STATE (128) |
|---|---|---|---|---|---|---|---|
| #0 | ON | HDD00 | ON | 01-0 | ON | 11-0 | ON |
| | | HDD01 | ON | | | | |
| | | HDD02 | ON | | | | |
| | | ... | ... | | | | |
| | | HDD14 | ON | | | | |
| #1 | ON | HDD00 | ON | 01-1 | ON | 11-1 | ON |
| | | HDD01 | OFF | | | | |
| | | HDD02 | ON | | | | |
| | | ... | ... | | | | |
| | | HDD14 | ON | | | | |
| #2 | ON | HDD00 | ON | 01-2 | ON | 11-2 | ON |
| | | HDD01 | OFF | | | | |
| | | HDD02 | ON | | | | |
| | | ... | ... | | | | |
| | | HDD14 | ON | | | | |
| #3 | ON | HDD00 | ON | 01-3 | ON | 11-4 | ON |
| | | HDD01 | OFF | | | | |
| | | HDD02 | ON | | | | |
| | | ... | ... | | | | |
| | | HDD14 | ON | | | | |
| ... | | | | | | | |

STORAGE CONTROL DEVICE

CROSS-REFERENCE TO RELATED APPLICATIONS

This application relates to and claims priority from Japanese Patent Application No. 2007-36301 filed on Feb. 16, 2007, the entire disclosure of which is incorporated herein by reference.

BACKGROUND OF THE INVENTION

1. Field of the Invention

The present invention relates to a storage control device.

2. Description of the Related Art

Storage control devices comprise a storage section produced by connecting a multiplicity of hard disk drives in the form of an array and provide a host computer ('host' hereinbelow) such as a server with a logical storage region (logical volume). In order to increase reliability and so forth, a redundant storage region based on RAID (Redundant Array of Independent Disks) in the storage control device is provided for the host.

Further, data that are to be managed by an enterprise or the like increases on a daily basis. Hence, a storage control device whose storage capacity can be increased in accordance with an increase in data volume is preferable. Further, a storage control device capable of providing a storage region that satisfies the user's needs by connecting a plurality of additional enclosures that provide a storage region to a base enclosure that governs a control function has been proposed (Japanese Application Laid Open No. 2001-339853).

According to the conventional technology that appears in Japanese Application Laid Open No. 2001-339853, the start or stoppage of the supply of power to the base enclosure and the start or stoppage of the supply of power to the respective additional enclosures are linked. As a result, in cases where the storage control device is completely stopped, the supply of power to all of the respective additional enclosures can be automatically stopped simply by stopping the supply of power to the base enclosure.

The respective magnetic disk devices that constitute the RAID group in a different conventional technology according to Japanese Application Laid Open No. 2000-293314 are made to enter sleep mode.

The conventional technology of Japanese Application Laid Open No. 2001-339853 merely links the operation to supply power to the base enclosure and the operation to supply power to the respective additional enclosures and the results of such technology are limited from the standpoint of reducing the amount of power consumption of the storage control device.

On the other hand, in the case of the conventional technology of the Japanese Application Laid Open No. 2000-293314, the amount of power consumption of the storage control device can be reduced because the magnetic disk device is made to enter sleep mode when same has not been accessed for a fixed period.

However, Japanese Application Laid Open No. 2000-293314 leaves room for additional improvement in the area of curtailing the power consumption amount of the respective magnetic disk devices that constitute the RAID group. In other words, even in cases where the respective magnetic disk devices have entered sleep mode, power is supplied to the control circuit section, cooling fan, and power supply circuit in the enclosure such that the operation continues. There is therefore room for improvement with respect to the power consumption amount of each of the parts other than the magnetic disk device.

SUMMARY OF THE INVENTION

The present invention was conceived in view of the above problem. An object of the present invention is to provide a storage control device capable of reducing the power consumption amount still further by supplying power in enclosure units or stopping the supply of power to each enclosure. A further object of the present invention is to provide a storage control device capable of implementing power conservation in enclosure units so that the stoppage of the supply of power to one enclosure does not affect the other enclosures. Yet another object of the present invention is to provide a storage control device capable of improving the reliability and power consumption amount by diagnosing the power supply control of each enclosure. Further objects of the present invention will become evident from the subsequent embodiments.

In order to resolve the above problem, in the case of a storage control device comprising a plurality of enclosures according to a first aspect of the present invention, any one of the enclosures is a first enclosure for controlling data communications with a higher-level device and the operation of the other enclosures; the other enclosures other than the first enclosure are second enclosures that each comprise a plurality of storage devices; the first enclosure and the respective second enclosures are connected via an interenclosure connection section for switch-connecting the first enclosure and the respective second enclosures. In addition, the first enclosure holds system constitution information for managing the constitution of the storage control device and the power supply state thereof and, by controlling a power supply circuit section for supplying power to each of the second enclosures on the basis of the system constitution information, the supply of power or stoppage of power is controlled individually for each of the second enclosures.

According to this embodiment, the first enclosure shifts to a power savings mode for suppressing power consumption for storage devices that have not been accessed for a preset predetermined time or more among the respective storage devices.

According to the embodiment of the present invention, in cases where, among the respective second enclosures, a predetermined second enclosure in which all of the storage devices in the enclosure have shifted to the power savings mode is detected, the first enclosure stops supplying power to all of the storage devices in the predetermined second enclosure.

According to the embodiment of the present invention, in cases where, among the respective second enclosures, a predetermined second enclosure in which all of the storage devices in the enclosure have shifted to the power savings mode is detected, the first enclosure stops supplying power to the predetermined second enclosure.

According to the embodiment of the present invention, the first enclosure stops supplying power to the predetermined second enclosure after stopping the supply of power to all of the storage devices in the predetermined second enclosure.

According to the embodiment of the present invention, in cases where the occurrence of a fault in the first enclosure is sensed, the power supply circuit section shifts to a state where power is supplied to the respective second enclosures.

According to the embodiment of the present invention, in cases where power is again supplied to the predetermined second enclosure, the first enclosure controls the predetermined second enclosure so that the storage devices in the predetermined second enclosure are activated following division of the storage devices into groups by a predetermined number of storage devices.

According to the embodiment of the present invention, the storage control device has, as the power supply circuit sections, first and second power supply circuit sections that supply power via different power supply paths to each of the second enclosures; wherein, in cases where the supply of power to the predetermined second enclosure is stopped, the first enclosure controls each of the first and second power supply circuit sections (1) first to stop the supply of power from the first power supply circuit section to the predetermined second enclosure; (2) to confirm that the supply of power from the first power supply circuit section to the predetermined second enclosure has stopped normally; (3) then to stop the supply of power from the second power supply circuit section to the predetermined second enclosure; and (4) to confirm that the supply of power from the second power supply circuit section to the predetermined second enclosure has stopped normally.

According to the embodiment of the present invention, the first enclosure judges whether, in cases where the supply of power from either the first power supply circuit section or the second power supply circuit section to the predetermined second enclosure has not been stopped normally, communication with a predetermined power supply circuit section for which the power supply has not been stopped normally among the first power supply circuit section and the second power supply circuit section is possible and provides an output to the effect that an anomaly has occurred in the predetermined power supply circuit section when communication is possible and provides an output to the effect that an anomaly has occurred in the communication path between the predetermined power supply circuit section and the first enclosure when communication is not possible.

According to the embodiment of the present invention, the first enclosure and the power supply circuit section are connected via a communication network, and the first enclosure controls the power supply circuit section by transmitting commands to instruct the start of the power supply or stoppage of the power supply to the power supply circuit section via the communication network.

According to the embodiment of the present invention, the interenclosure connection section and the power supply circuit section are connected; and the first enclosure instructs the power supply circuit section to start the power supply or stop the power supply via the interenclosure connection section.

According to the embodiment of the present invention, the first enclosure diagnoses whether the second enclosure to which the power supply has stopped is operating normally by supplying power thereto at regular or irregular intervals.

A storage control device having a plurality of enclosures according to another perspective of the present invention comprises a first enclosure; second enclosures having a plurality of storage devices respectively; a power supply circuit section for supplying external power to the first enclosure and the respective second enclosures; and an interenclosure connection section for switch-connecting the first enclosure and the respective second enclosures, wherein the first enclosure comprises at least: a system constitution information management section for managing system constitution information related to the constitution of the storage control device and power supply state thereof; a first control section for processing the power supply to the respective second enclosures and the data I/O between the higher level device and the respective storage devices on the basis of the system constitution information managed by the system constitution information management section; and a first enclosure-contained power supply section for supplying predetermined power to the first control section by converting the external power supplied via the power supply circuit section to a predetermined voltage, wherein the respective second enclosures comprise at least: a plurality of the storage devices for storing data to be used by the higher-level device; a second control section for controlling the data I/O to and from the respective storage devices and the operation of a second enclosure-contained power supply section in accordance with instructions from the first control section; and the second enclosure-contained power supply section for supplying power to the respective storage devices and the second control section by converting the external power supplied via the power supply circuit section to a predetermined voltage; and wherein the power supply circuit section comprises switch sections that are each provided midway along the power supply path between the respective second enclosure-contained power supply sections and the external power supply, the respective switch sections opening or closing the respective power supply paths in accordance with an instruction from the first control section; and the first control section closes the power supply path between the second enclosure-contained power supply section of a predetermined second enclosure for which judgment is made, based on the system constitution information, that access to the respective storage devices present in the second enclosure among the respective second enclosures, is unnecessary, and the external power supply, by operating the switch section that is connected to the predetermined second enclosure.

According to this embodiment, the first control section is able to execute: (1) a first mode in which, among the respective storage devices, those that have not been accessed for a preset predetermined time or more are shifted to a power savings mode in which power consumption is suppressed; (2) a second mode in which, when among the respective second enclosures a predetermined second enclosure in which all of the storage devices in the enclosure have shifted to the power savings mode is detected, the supply of power to all of the storage devices in the predetermined second enclosure is stopped; and (3) a third mode in which the supply of power to the predetermined second enclosure is stopped after stopping the supply of power to all of the storage devices in the predetermined second enclosure.

According to this embodiment, the power supply circuit section detects whether a fault has occurred in the first control section by communicating at regular intervals with the first control section and, in cases where the occurrence of a fault in the first control section is detected, turns ON the respective switch sections to allow power to pass through the respective power supply circuits.

BRIEF DESCRIPTION OF THE DRAWINGS

FIG. 14 is an explanatory diagram showing a table for managing volumes;

FIG. 15 is an explanatory diagram showing a table for managing power supply states;

DESCRIPTION OF THE SPECIFIC EMBODIMENTS

Figure 1:
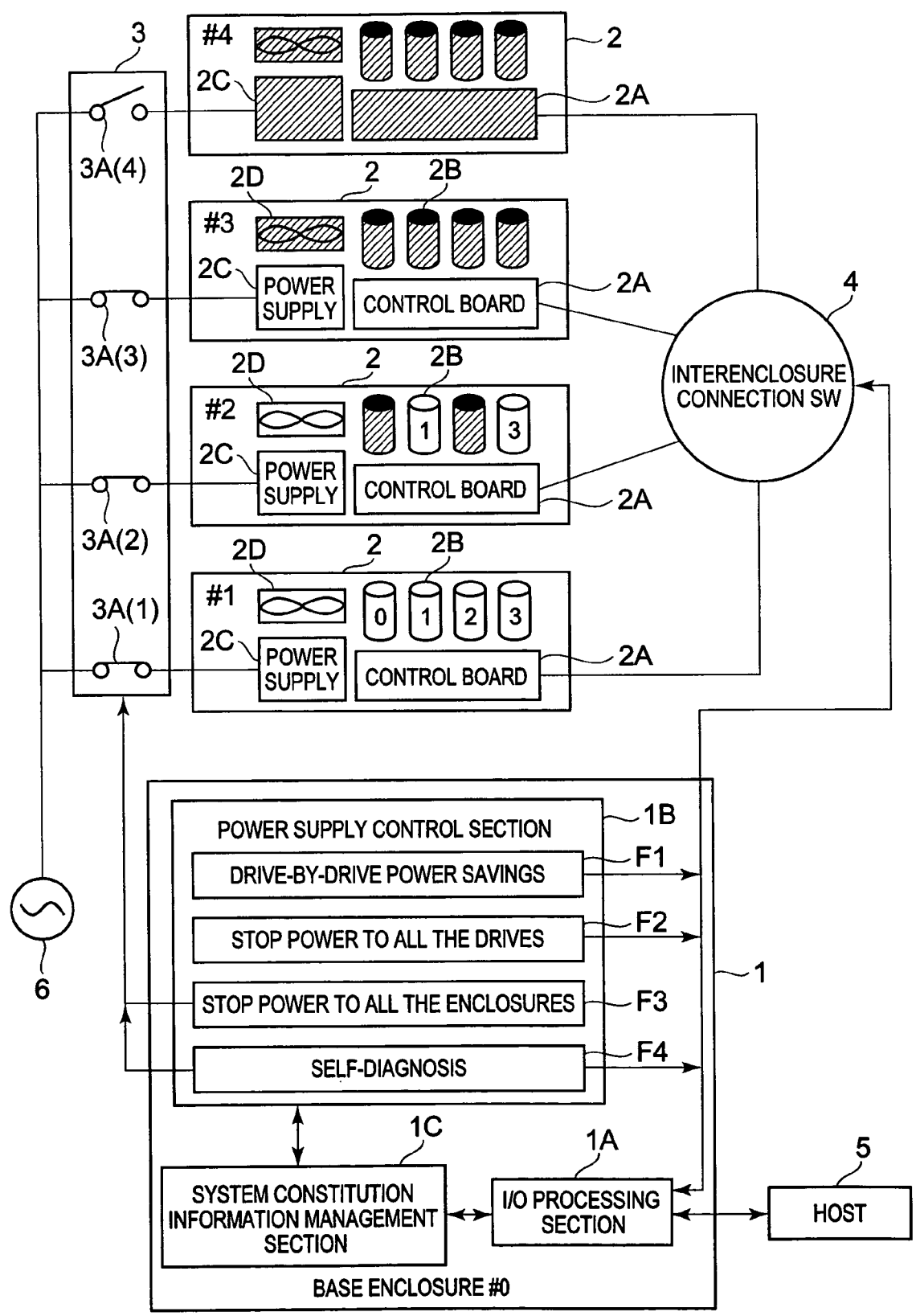
FIG. 1 is an explanatory diagram of the concept of an embodiment of the present invention.

Embodiments of the present invention will be described hereinbelow on the basis of the drawings. FIG. 1 is an explanatory diagram providing an overview of the storage control device according to this embodiment.

The storage control device is constituted by stacking enclosures 1 and 2 of a plurality of types, for example. An enclosure of one type is a base enclosure 1 and an enclosure of another type is an additional enclosure 2.

The base enclosure 1 corresponds to a first enclosure and the additional enclosure 2 corresponds to a second enclosure. The base enclosure 1 and additional enclosure 2 are switch-connected via an interenclosure connecting switch 4. The transmission of data and signals between the base enclosure 1 and the respective additional enclosures 2 is carried out via the interenclosure connecting switch 4. In other words, the additional enclosures 2 are connected in the form of a star with the base enclosure 1 at the center thereof. The base enclosure 1 is an enclosure that governs control of all of the storage control devices and is connected to a host 5, which is a higher-level device, and to each of the additional enclosures 2. The base enclosure 1 accesses the disk drives 2B in the additional enclosures 2 and reads and writes data from and to the disk drives 2B in accordance with commands issued by the host 5.

The base enclosure 1 is constituted comprising an I/O processing section 1A, a power supply control section 1B, and a system constitution information management section 1C, for example. Further, as will also be clear from the following embodiments, the base enclosure 1 can also comprise disk drives.

The I/O processing section 1A writes data or reads data by accessing the disk drives 2B in the respective additional enclosures 2 on the basis of commands issued by the host 5.

The power supply control section 1B is one of the control functions of the base enclosure 1 and controls the supply and stoppage of power for the respective additional enclosures 2. The power supply control section 1B is able to execute power conservation modes F1 to F3 of a plurality of types with respective timing.

In mode F1, which implements power conservation in drive units, power conservation for each drive is implemented by stopping the transmission of power to the motors of disk drives 2B that have not been accessed for a fixed period and a portion of the electronic circuit is halted, for example.

In mode F2, in which the transmission of power to all the drives is stopped, power conservation is implemented for all of the disk drives in the enclosure by stopping the transmission of power to all the disk drives 2B provided in the same enclosure. Further, in mode F2, for example, the transmission of power to a device capable of stopping in accordance with the stoppage of all the disk drives 2B such as cooling fan 2D, for example, can also be stopped.

In mode F3, in which the transmission of power to the whole enclosure is stopped, the supply of power from an external power supply 6 to the additional enclosures 2 is completely stopped by opening switches 3A of a power supply circuit section 3. In mode F3, the respective functions of the additional enclosures 2 are stopped to maximize the power conservation effects.

The power supply control section 1B comprises a self-diagnosis mode F4. In self-diagnosis mode F4, by transmitting power at regular or irregular intervals to the additional enclosures 2 for which the transmission of power to the whole enclosure has been stopped, it is diagnosed whether the additional enclosures 2 are operating correctly.

The system constitution information management section 1C stores and manages information relating to the system constitution of the storage control device. Information relating to the system constitution can include, for example, information relating to the disposition of the disk drives 2B, information relating to the constitution of the RAID group or logical volumes, and information relating to the connection constitution of the additional enclosure 2 and the power supply circuit section 3. In this embodiment, all the constitution information relating to the storage control device is integrally managed by the base enclosure 1. The power supply control section 1B stops the transmission of power to the intended additional enclosures 2 by referencing the system constitution information.

The power supply circuit section 3 is a circuit for distributing AC power from the external power supply 6 to the enclosures 1and 2, for example. Here, the power distribution to the base enclosure 1 is omitted but, as will become evident from the subsequent embodiments, the external power supply 6 and base enclosure 1 are connected via the power supply circuit section 3.

The power supply circuit section 3 comprises switches 3A which connect the respective additional enclosures 2 to the external power supply 6. Hence, in cases where the supply of power to the target additional enclosure 2 is stopped, the switch 3A connected to the additional enclosure 2 is opened. As a result, the path for the supply of power from the external power supply 6 to the target additional enclosure 2 is shut off.

The power supply circuit section 3 can be constituted as a circuit substrate on which the respective enclosures 1 and 2 are independent. The power supply circuit section 3 is not limited to such a constitution, however. The power supply circuit section 3 can also be provided in the respective enclosures 1 and 2. In other words, the constitution may also be such that the switches 3A are provided in each of the additional enclosures 2, for example.

The additional enclosures 2 are constituted comprising a CONTROL BOARD 2A, a plurality of disk drives 2B, a power supply section 2C, and a cooling fan 2D, for example. The CONTROL BOARD 2A makes data I/O with respect to the disk drives 2B based on instructions from the base enclosure 1.

The disk drives 2B correspond to storage devices. Here, for the sake of convenience, the disk drives 2B are referred to as disk drives but may also be storage devices that use media other than disks. Devices that can be used as the disk drive 2B include, for example, hard disk drives, semiconductor memory devices, flash memory devices, optical disk drives, magneto-optical disk drives, magnetic tape devices, and holographic memory devices and so forth.

The power supply section 2C corresponds to an in-enclosure power supply section. The power supply section 2C converts AC power or DC power that is input from the external power supply 6 via the power supply circuit section 3, for example, into DC power of a predetermined voltage and supplies the DC power to the CONTROL BOARD 2A, the respective disk drives 2B, and the cooling fan 2D respectively. The power supply section 2C is able to output voltages of a plurality of types. Further, the external power supply 6 is not limited to an AC power supply and may be also be a DC power supply. As will be evident from the subsequent embodiments, the power supply section 2C can be constituted capable of stopping the transmission of power to the respective disk drives 2B in accordance with an instruction from the CONTROL BOARD 2A.

The cooling fan 2D performs cooling by guiding a cooling air stream into the additional enclosure 2. The cooling fan 2D operates in accordance with signals from the CONTROL BOARD 2A. In other words, the CONTROL BOARD 2A is able to control the start of the operation of the cooling fan 2D, the stoppage of the operation of the cooling fan 2D, and the speed of the cooling fan 2D, for example. Further, although a cooling fan 2D is cited as the cooling mechanism, the additional enclosure 2 may also be constituted comprising a water-cooling mechanism. In the case of a water-cooling mechanism, the power consumption amount of the additional enclosure 2 is curtailed by controlling the operation of a cooling water circulating pump or heat exchanger or the like.

As mentioned earlier, in this embodiment, the respective additional enclosures 2 are disposed in the form of a star with the base enclosure 1 at the center thereof. Hence, by virtue of communicating with the base enclosure 1, the respective additional enclosures 2 are independent and do not affect the other additional enclosures 2. In other words, even in cases where the supply of power to a certain additional enclosure 2 is shut off and stops completely, the other additional enclosures 2 are able to communicate with the base enclosure 1. Hence, the base enclosure 1 is able to freely stop the supply of power to the target additional enclosure 2.

Here, the disk drives 2B can be divided into a plurality of groups according to the performance and reliability of the disk drives 2B. For example, the disk drive 2B is a disk drive with a high performance such as an FC (Fibre Channel) disk or a low-performance disk drive such as a SATA (Serial AT Attachment) disk, or the like, for example. The respective additional enclosures 2 can contain disk drives 2B of the same type. In other words, a certain additional enclosure 2 contains only high-performance disk drives 2B and the other additional enclosures 2 contain only low-performance disk drives 2B.

Further, the high-performance disk drives 2B store data that are used frequently by the host 5, for example, and the low-performance disk drives 2B store data that are used infrequently by the host 5 (backup data and archive data, for example). As a result, the time for supplying power to the additional enclosures 2 containing the low-performance disk drives 2B can be shortened and the power consumption amount can be reduced.

Thus, as shown in FIG. 1, power is being supplied to each part of the additional enclosure 2 (#1). Mode F1 is applied to the disk drives 2B in the additional enclosure 2 (#2) that have not been accessed for a predetermined time or more. The rotation of the spindle motors of the disk drives 2B that have not been accessed for a predetermined time or more is stopped or reduced and a portion of the electronic circuit is stopped such that a portion of the electronic circuit is stopped, for example.

Mode F2 is applied to the additional enclosure 2 (#3). In other words, the transmission of power to the respective disk drives 2B and cooling fans 2D is stopped. Mode F3 is applied to the additional enclosure 2(#4). In this mode, switch 3A (4) opens, because the path for the supply of power between the external power supply 6 and the additional enclosure 2 (#4) is then shut off, the supply of power to the additional enclosure 2 (#4) is stopped.

For the storage control device of this embodiment, the transition between modes is sequential such as mode F1, then mode F2, and then mode F3, for example. However, this does not necessarily mean that such mode transitions are always made; there are also cases where mode transitions are made from mode F3 to F1 or from mode F2 to mode F1, for example, depending on the usage state received from the host 5.

As will become evident in subsequent embodiments, power can be transmitted at regular or irregular intervals to the additional enclosures 2 to which the supply of power has been stopped and it is also possible to diagnose whether the additional enclosures 2 are operating correctly. Therefore, the power consumption amount of the whole storage control device can be reduced while checking the reliability of the additional enclosures 2 that have been stopped for long periods.

As will become evident in the subsequent embodiments, the power supply circuit section 3 is able to detect whether an anomaly has occurred in the base enclosure 1 by communicating with the base enclosure 1 at regular intervals. In cases where an anomaly is detected in the base enclosure 1, the power supply circuit section 3 sets the respective switches 3A to the ON state to connect the external power supply 6 to each of the internal power supplies 2C. The storage control device of this embodiment will be described in detail hereinbelow.

First Embodiment

Figure 2:
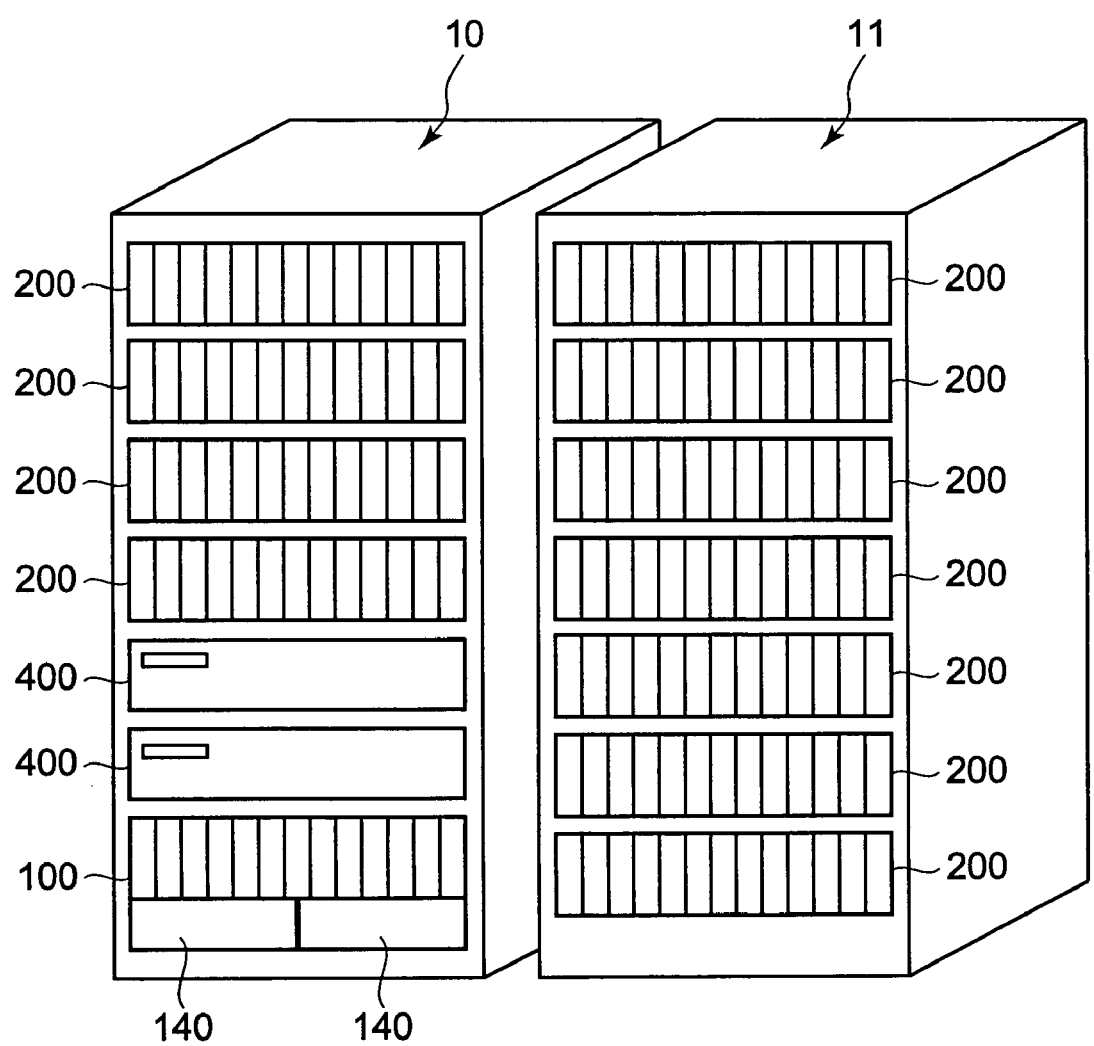
FIG. 2 is a perspective view of the outside appearance of the storage control device.

FIG. 2 is a schematic view of the external constitution of the storage control device. The storage control device is constituted by using a cable or the like to connect a base rack 10 and additional rack 11, for example. The base rack 10 comprises a base enclosure 100, a plurality of additional enclosures 200, and a plurality of backend switches 400, for example. The base rack 10 constitutes the minimum constitution of the storage control device and the functions of the storage control device can be implemented by the base enclosure 10 alone.

The additional rack 11 comprises a plurality of additional enclosures 200, for example. In cases where the storage capacity of the base rack 10 is insufficient, the storage capacity can be increased by connecting the additional rack 11 to the base rack 10. Further, the constitution may also be such that all or a portion of the backend switches 400 are provided in the additional rack 11.

Figure 3:
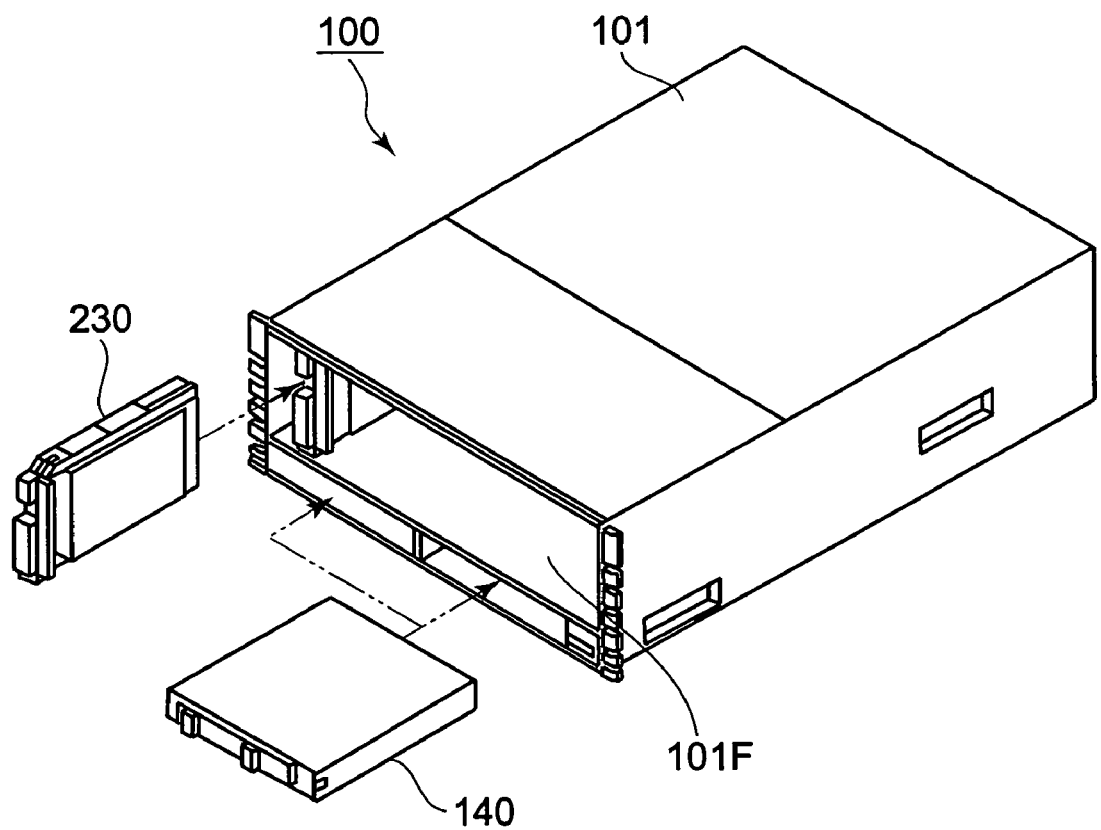
FIG. 3 is a perspective view of a base enclosure as seen from the front.

FIG. 3 is a perspective view of the base enclosure 100 as seen from the front. The front side 101F of casing 101 of the base enclosure 100 is provided with a plurality of batteries 140 and a plurality of disk drives 230. The base enclosure 100 may be constituted comprising disk drives 230 or may be constituted without the disk drives 230. In cases where the disk drives 230 are not provided, predetermined locations of the front side 101F contain other constituent parts such as batteries or are covered by facing plates or the like.

Figure 4:
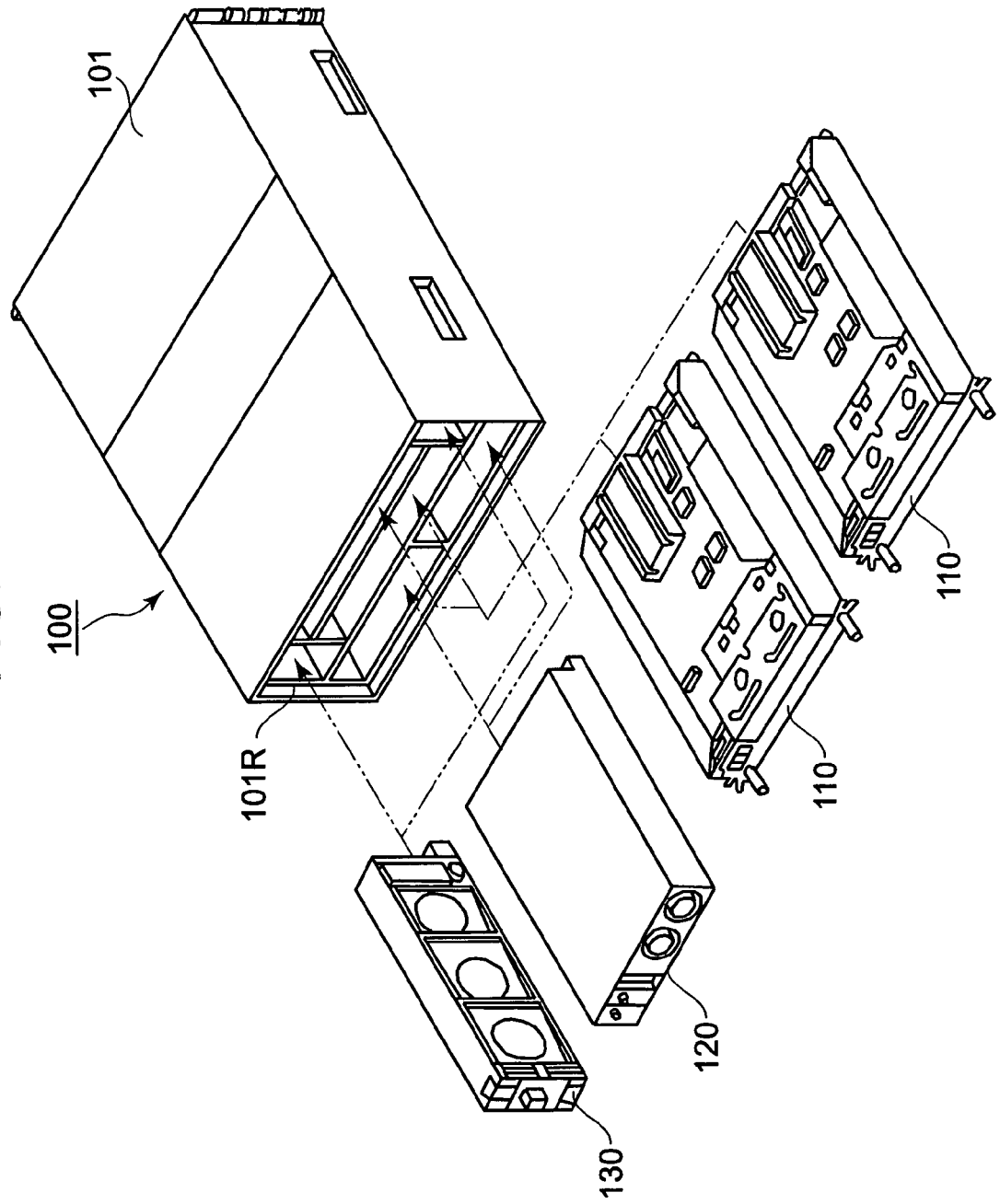
FIG. 4 is a perspective view of an additional enclosure as seen from the rear.

FIG. 4 is a perspective view of the base enclosure 100 as seen from the rear. The rear side 101R of the casing 101 has a plurality of controllers 110, a plurality of AC/DC power supply sections 120, and a plurality of cooling fans 130, for example, mounted therein. The cooling fans 130 are each constituted as a fan assembly in which a plurality of fans are integrated and are disposed on the left and right sides of the casing 110. The controllers 110 are disposed vertically in parallel in the middle of the casing 101. The AC/DC power supply sections 120 are disposed laterally in parallel at the bottom of the casing 101. Although the constitution is also the same in the following description of the additional enclosures 200, the constitution of the base enclosure 100 and additional enclosure 200 is not limited to that shown in Figures.

Figure 5:
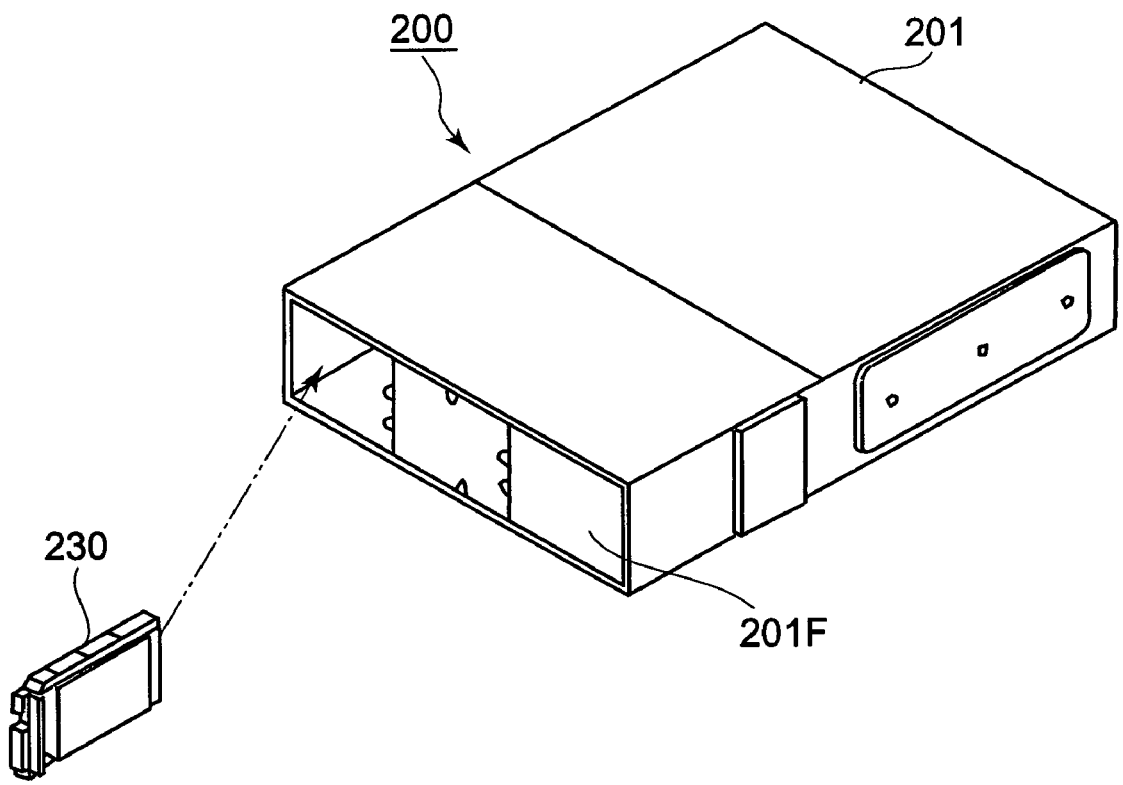
FIG. 5 is a perspective view of an additional enclosure as seen from the front.

FIG. 5 is a perspective view of the additional enclosure 200 as seen from the front. The front side 201F of the casing 201 of the additional enclosure 200 can have a plurality of disk drives 230 mounted therein. In this embodiment, a case where a total of fifteen disk drives 230 numbered from #0 to #14 are mounted will be described by way of example. The number of mounted disk drive per enclosure is not limited to fifteen. The invasion of dust and so forth from the outside into the casing 201 is prevented by using a facing plate or the like to cover spaces where disk drives 230 are not mounted.

Figure 6:
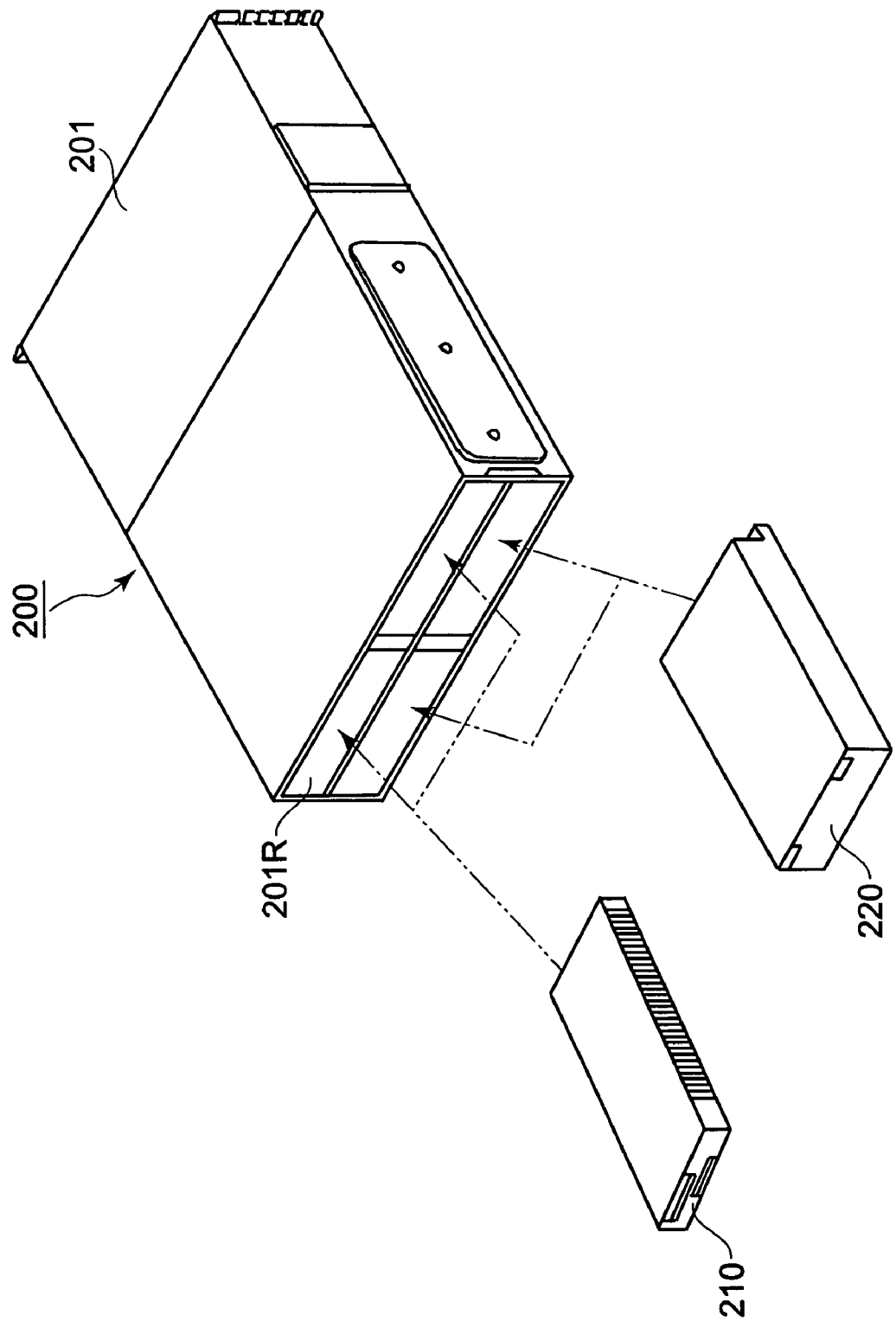
FIG. 6 is a perspective view of an additional enclosure as seen from the rear.
Figure 10:
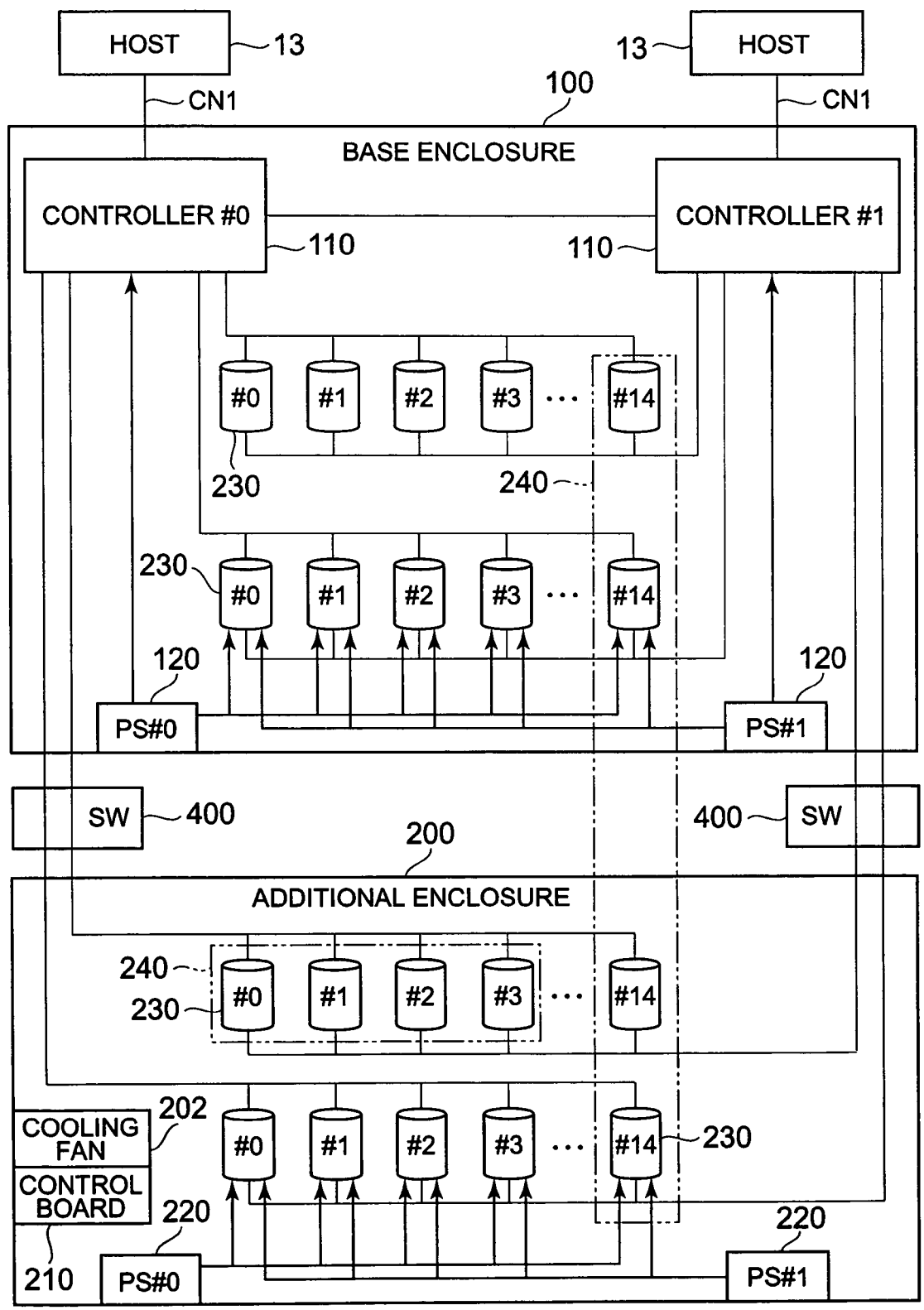
FIG. 10 is an explanatory diagram that simplifies the constitution of the storage control device.

FIG. 6 is a perspective view of the additional enclosure 200 as seen from the rear. A plurality of CONTROL BOARDs 210 and a plurality of AC/DC power supply sections 220 are each mounted in the rear side 201R of the casing 201. Further, although a cooling fan is not installed in the AC/DC power supply section 220 in the constitution of FIG. 6, as shown in FIG. 10, a cooling fan 202 can be provided in the additional enclosure 200. In other words, the cooling fan and AC/DC power supply section may be provided as separate constituent parts.

Figure 7:
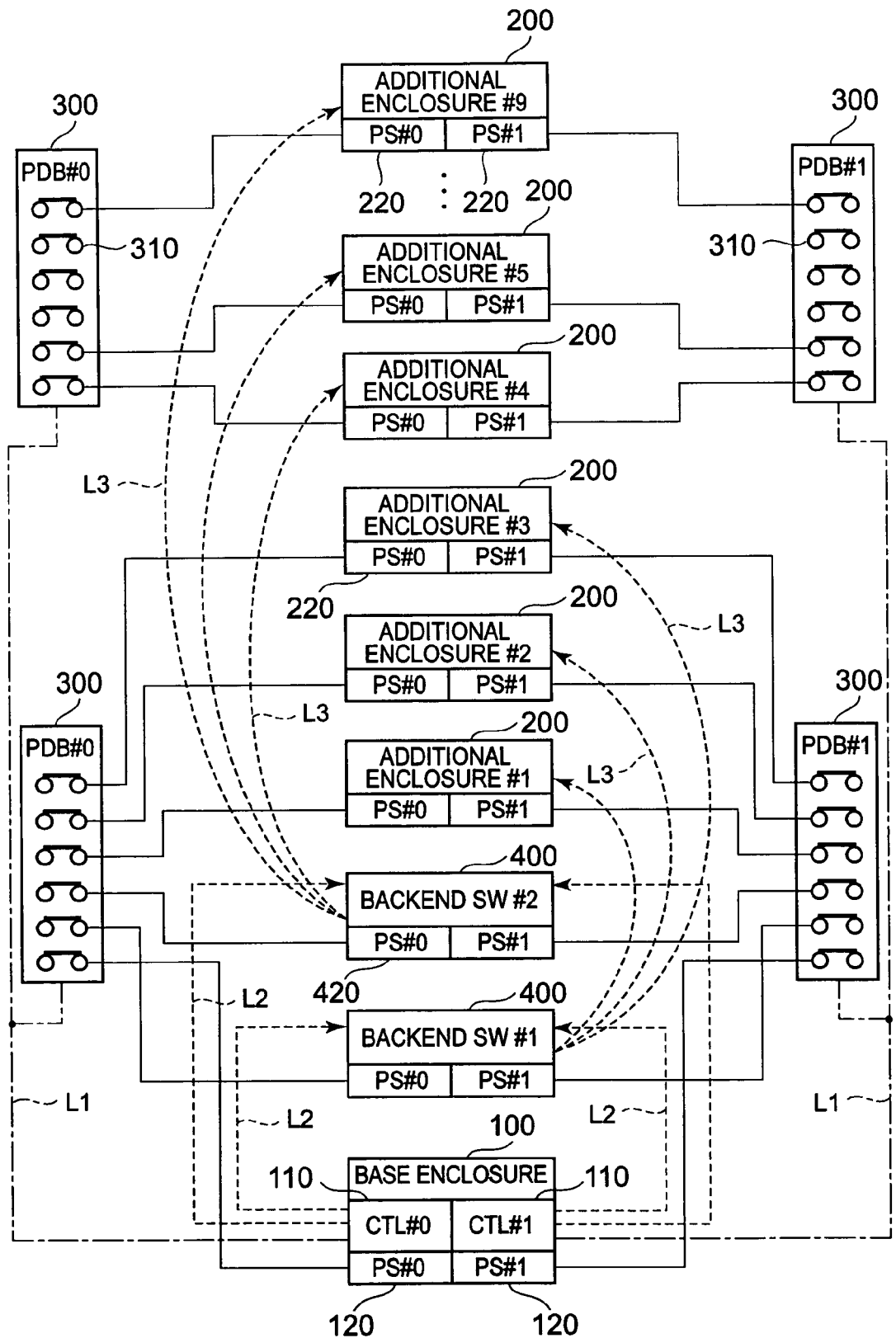
FIG. 7 is an explanatory diagram that schematically shows a connection configuration of the storage control device.

FIG. 7 is an explanatory diagram that schematically shows the constitution of the storage control device. Power distribution circuit sections 300 for supplying power from the outside to the respective enclosures 100 and 200 are provided in the respective racks 10 and 11. In the following description, the power supply distribution circuit sections 300 are called PDB (Power Distribution Boxes).

The storage control device can comprise a plurality of power supply channels. One such channel is the channel indicated by PDB#0 on the left in FIG. 7, while another channel is a channel indicated by PDB#1 on the right in FIG. 7. In other words, the power supply structure of the storage control device is redundant.

The respective PDB300 are able to distribute power from the outside to a predetermined number of enclosures such as four or six, for example. Therefore, in cases where a multiplicity of enclosures are mounted in one rack, a plurality of PDB300 are required for each of a plurality of power supply channels. Further, in contrast, the constitution may also be such that a single PDB capable of distributing power from the outside to the maximum number of enclosures that can be mounted in the rack is used for each power supply channel.

Each PDB300 comprises a predetermined number of switches 310. Each switch 310 is connected to the AC/DC power supply section of the corresponding enclosure. In FIG. 7, the AC/DC power supply sections are shown abbreviated as 'PS'.

The respective power supply sections 120 of the base enclosure 100 are connected to the respective switches 310 of the PDB300 of the respective other channels. Likewise, the respective power supply sections 220 of the respective additional enclosures 200 are also connected to the respective switches 310 of the PDB300 of the respective other channels. Therefore, even in cases where a fault has occurred in either one PDB300, power can be supplied from the other PDB300 to the respective enclosures 100 and 200.

The controllers 110 of the base enclosure 100 are connected to the respective PDB 300 via signal lines L1 as indicated by the dot-chain lines in FIG. 7. The details will be provided subsequently. However, the controllers 110 are able to control the opening and closing of the respective switches 310 individually. In cases where the supply of power to a target additional enclosure 200 is completely stopped, the controllers 110 shut off the power supply path between the external power supply and the power supply section 220 by opening each of the switches 310 of the respective channels connected to the additional enclosure 200.

Further, the respective controllers 110 and respective PDB300 may be wire-connected or wirelessly connected. In the case of a wireless connection, a circuit for opening and closing the respective switches 310 in accordance with a wireless signal from the controllers 110 may be provided in the PDB300.

The backend switch 400 is a device for switch-connecting the base enclosure 100 and the respective additional enclosures 200. The respective backend switches 400 are connected to predetermined additional enclosures 200 via signal lines L3 as indicated by the dotted lines in FIG. 7. Although omitted for the sake of convenience in FIG. 7, the respective signal lines L3 are redundant such that, even when one signal line L3 is broken, communication is possible as a result of the other signal line L3.

The respective backend switches 400 and the controllers 110 of the base enclosure 100 are connected via signal lines L2. The respective controllers 110 communicate with the desired additional enclosures 200 via the backend switches 400 which are connected to the desired additional enclosures 200.

Figure 8:
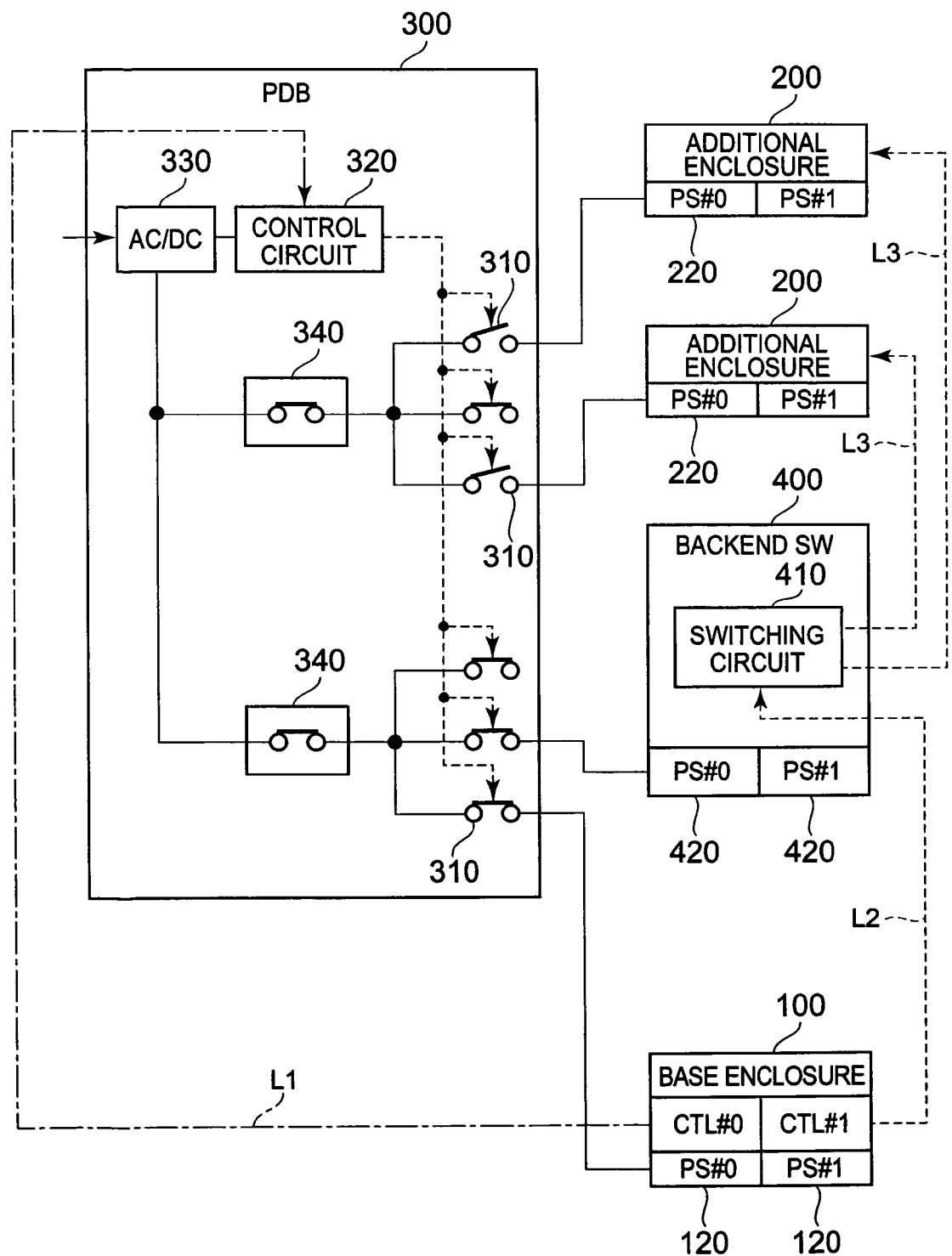
FIG. 8 is a circuit diagram with an emphasis on a portion of the storage control device.

FIG. 8 is a circuit diagram that shows a certain part of the constitution of FIG. 7 in detail. The PDB300 is constituted comprising, for example, a plurality of switches 310, a control circuit 320, an AC/DC power supply section 330, and a plurality of breakers 340. The AC power input from the outside is converted to DC power by the AC/DC power supply section 330. The converted DC power is supplied to the power supply sections 220 in the additional enclosures 200 and the power supply sections 120 in the base enclosure 100 via the breakers 340 and switches 310.

The control circuit 320 is connected to the controllers 110 via a signal line L1 such as a LAN (Local Area Network), for example. The control circuit 320 turns designated switches 310 ON or OFF in accordance with commands that are issued by the controllers 110. Here, turning a switch 310 ON means that the connection point of the switch 310 is closed to produce a state of conduction and turning a switch 310 OFF means that the connection point of the switch 310 is opened to produce a state where the power is shut off.

As shown in FIG. 8, the backend switches 400 comprise a switching circuit 410. The switching circuit 410 is connected to a controller 110 via a signal line L2. The switching circuit 410 is connected to the respective additional enclosures 200 via the respective signal lines L3. The switching circuit 410 is connected to a designated additional enclosure 200 and the base enclosure 100 in accordance with an instruction from the controller 110.

Figure 9:
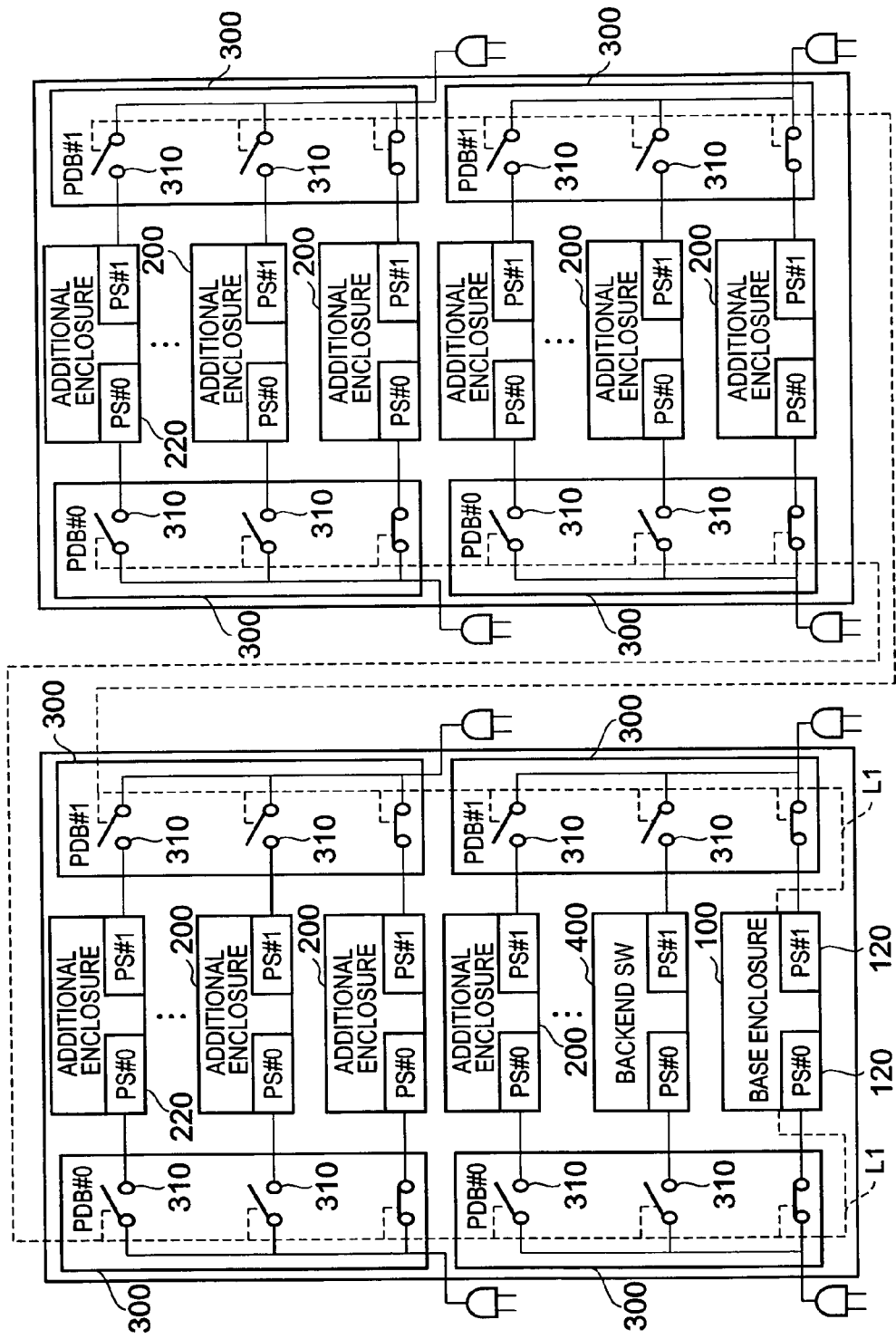
FIG. 9 is an explanatory diagram that shows the power supply structure of the storage control device.

FIG. 9 is an explanatory diagram that schematically shows the power supply structure of the storage control device. In FIG. 9, part of the constitution is omitted due to the space constraints of the page.

FIG. 10 is an explanatory diagram that schematically shows the internal constitution of the storage control device. The respective controllers 110 of the base enclosure 100 are connected to hosts 13 via a communication network CN1. Further, the respective controllers 110 are also connected to the management terminal 14 via a communication network CN2 as shown in FIG. 11.

The host 13 accesses the storage control device in accordance with a request from the client terminal (outside FIG. 10), for example and reads and writes data. Examples of the host 13 include, for example, a mainframe computer or a server computer. Examples of the communication network CN1 include, for example, a LAN, SAN (Storage Area Network), the Internet, or a dedicated line.

When a LAN is used, the host computer 13 and storage control device communicate in accordance with TCP/IP (Transmission Control Protocol/Internet Protocol). When a SAN is used, the host computer 13 and storage control device communicate in accordance with the Fiber Channel protocol. Further, in cases where the host computer 13 is a mainframe computer, data is transferred in accordance with a communication protocol such as FICON (Fibre Connection: registered trade name), ESCON (Enterprise System Connection: registered trade name), ACONARC (Advanced Connection Architecture: registered trade name), or FIBARC (Fibre Connection Architecture: registered trade name), for example.

Figure 11:
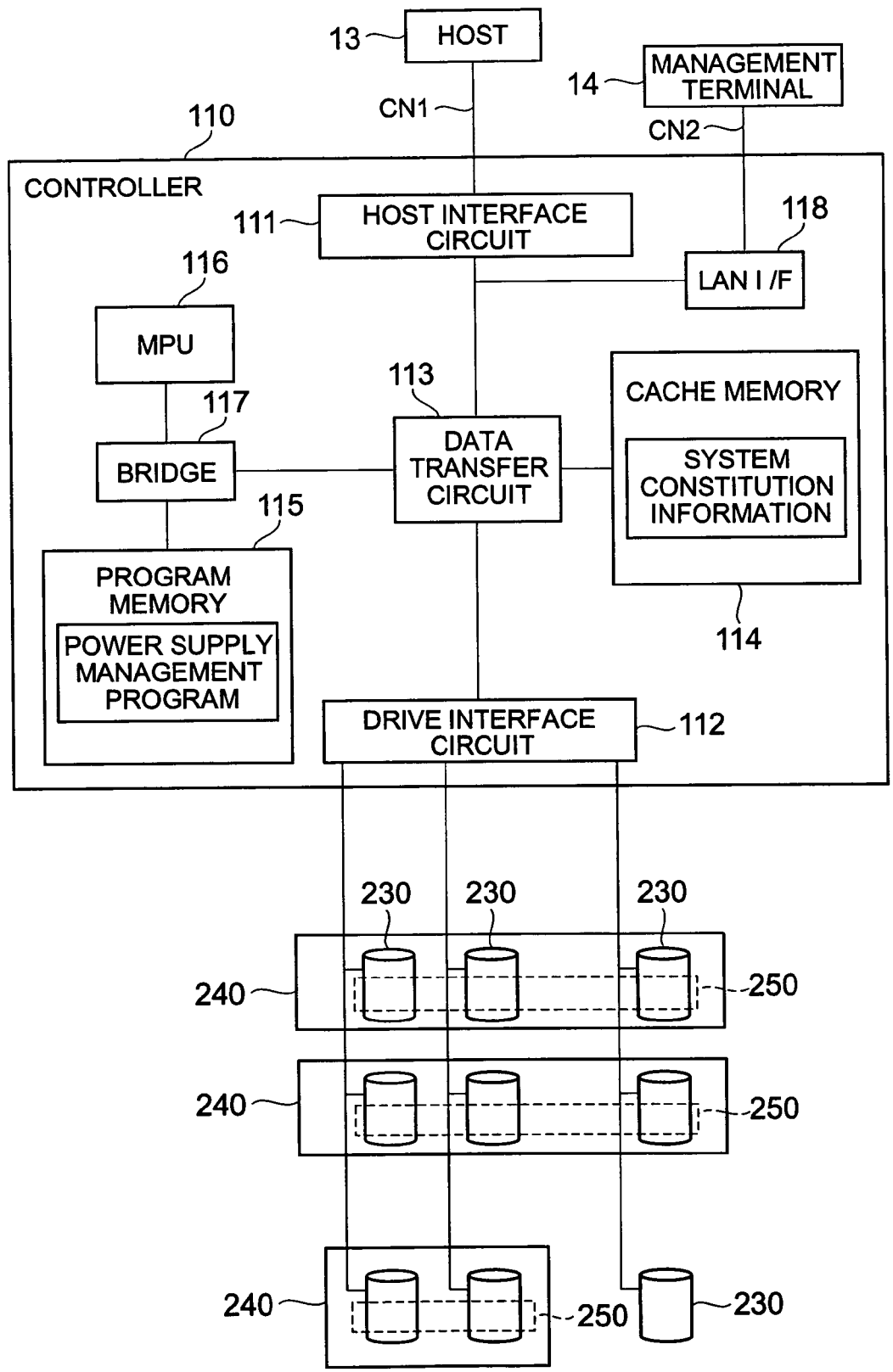
FIG. 11 is an explanatory diagram that shows the constitution of the controller.

In addition, as shown in FIG. 11, the management terminal 14 can also be connected to the storage control device via the communication network CN2 which is used for management. The management terminal 14 is a computer terminal for making various settings for the storage control device. The management terminal 14 can also be connected to a management server (outside FIG. 11). The management server can be constituted as a computer device that is capable of centrally managing a plurality of storage control devices.

Let us now return to FIG. 10. The control channels of the storage control device can be redundant in the same way as the power supply channels. The #0 controller 110 and #1 controller 110 are able to access all the disk drives 230 working under the #0 controller 110 and #1 controller 110. In other words, even when a fault has occurred in either system, data access is possible from the other channel. The overall operation of the storage control device is controlled by the controllers 110 in the base enclosure 100. Hence, the respective controllers 110 are able to access not only the respective disk drives 230 in the base enclosure 100 but also the respective disk drives 230 in the additional enclosures 200.

The respective power supply sections 120 of the base enclosure 100 supply DC power of predetermined voltages to the respective controllers 110 and the respective disk drives 230 in the base enclosure 100. The power supply sections 120 are able to output power of a plurality of types such as DC 5 volts and DC 12 volts. Further, although FIG. 10 shows power as being supplied only to the lower disk drives 230 for the sake of convenience in the description, the respective power supply sections 120 supply power to all of the disk drives 230 in the enclosure.

An additional enclosure 200 is shown at the bottom of FIG. 10. Due to space constraints of the page, only one additional enclosure 200 is shown. As mentioned earlier, the base enclosure 100 is switch-connected via a plurality of additional enclosures 200 and backend switches 400.

The power supply sections 220 of the additional enclosure 200 convert power which is input from the outside to DC power of a predetermined voltage and output the DC power in the same way as the power supply sections 120. DC power is supplied by the respective power supply sections 220 to all of the disk drives 230 present in the enclosure, the CONTROL BOARD 210, and cooling fan 202. Further, although DC power is supplied by the respective power supply sections 220 for the sake of convenience in the description, the constitution may also be such that, normally, DC power is supplied to the respective disk drives 230 and the CONTROL BOARD 210 and so forth by only one of the power supply sections 220 (power supply section #0, for example), for example. By treating the impedance from the viewpoint of the respective power supply sections 220 differently from the load of the disk drives 230 and CONTROL BOARD 210 and so forth, power can be supplied from either one of the power supply sections 220. For example, diodes of a greater number of stages than the other power supply section 220 may be provided at the output from one power supply section 220. As a result, when a fault occurs, it is possible to switch automatically to the other power supply section 220 without performing switching a switch.

The disk drives 230 are constituted as hard disk drives such as ATA (AT Attachment) disks, SCSI (Small Computer System Interface) disks, FC (Fibre Channel) disks, for example. The disk drives 230 are not limited to the aforementioned disks, however. For example, other storage devices such as semiconductor memory drives (including flash memory devices), optical disk drives, and magneto-optical disk drives may also be used.

A RAID group 240 is constituted by a predetermined number of disk drives 230 such as one set of four or one set of eight, for example. The RAID group 240 can be constituted by a plurality of disk drives 230 that exist in separate enclosures or can be constituted by one or a plurality of disk drives 230 that exist in the same enclosure.

As shown in FIG. 11, one or a plurality of logical volumes 250 can be provided in the RAID group 240. A logical volume 250 is a target that is accessed by the host 13 and stores data that is used by the host 13.

FIG. 11 is a block diagram for a case where one controller 110 is considered. The controller 110 is constituted comprising, for example, a host interface circuit 111, a drive interface circuit 112, a data transfer circuit 113, a cache memory 114, a program memory 115, a processor (abbreviated as 'MPU' in FIG. 11) 116, a bridge 117, and a LAN interface 118.

The host interface circuit 111 controls communications with the host 13. Various commands and data issued by the host 13 are received by the host interface circuit 111. A communication regarding the end of processing of the data and commands that are read from the disk drives 230 is transmitted by the host interface circuit 111 to the host 13.

The drive interface circuit 112 controls communications with the respective disk drives 230. The drive interface circuit 112 performs a conversion operation and so forth to convert logical block addresses (LBA) and the physical addresses of the disk drives 230.

The data transfer circuit 113 is a circuit for controlling data transfer in the controller 110. The data transfer circuit 113 controls data transfers between the host interface circuit 111 and cache memory 114 and data transfers between the drive interface circuit 112 and cache memory 114.

The processor 116 comprises one or a plurality of processor cores. The processor 116 implements the subsequently described power control and so forth by reading and executing various programs such as power supply management programs stored in the program memory 115.

The cache memory 114 stores data received by the host 13 and data read by the host 13. The cache memory 114 also stores information related to the system constitution of the storage control device. The stored content of the cache memory 114 is backed up by the batteries 140.

The bridge 117 connects the processor 116 and program memory 115. Further, the processor 116 is connected to the data transfer circuit 113 via the bridge 117.

The LAN interface 118 is a circuit for connecting the management terminal 14 and the controller 110. The user is able to supply various instructions to the controller 110 via the management terminal 14, read and information related to the various states of the storage control device and display this information on a screen.

Figure 12:
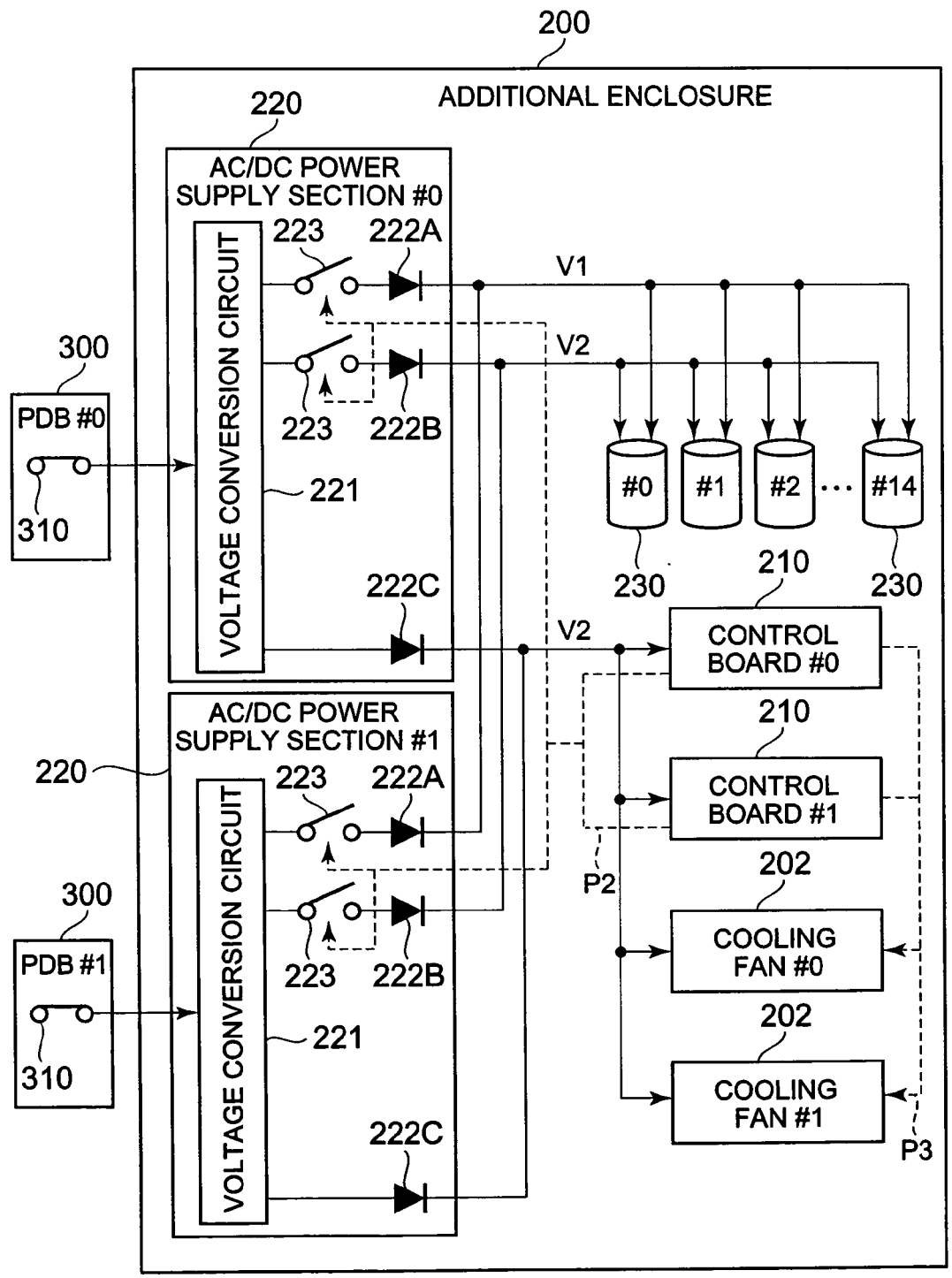
FIG. 12 is an explanatory diagram of the constitution of an additional enclosure.

FIG. 12 is a block diagram of the additional enclosure 200. First, the constitution of the AC/DC power supply section 220 will be described. The power supply section 220 comprises, for example, a voltage conversion circuit 221, a plurality of output diodes 222A to 222C, and an output control switch 223.

The voltage conversion circuit 221 converts AC power that is input via the PDB300 into DC voltages V1 and V2 of a plurality of types and outputs DC voltages V1 and V2. For example, V1 is set at about DC 5 volts and V2 is set at about DC 12 volts. The output diodes 222A to 222C are provided for the sake of preventing backflow. The switch 223 serves to control whether a DC voltage is output and is switched by the CONTROL BOARD 210.

V1 and V2 are supplied to the respective disk drives 230. V2 is supplied to each of the respective CONTROL BOARDs 210 and the respective cooling fans 202. As shown in FIG. 12, the outputs of the two power supply sections 220 are OR-connected. Therefore, even when a fault occurs with one of the power supply sections 220, power of a predetermined voltage is supplied to the CONTROL BOARDs 210 and disk drives 230 by the other power supply section 220. In cases where the outputs V1 and V2 from the respective power supply sections 220 are stopped, the power supply to all of the disk drives 230 in the enclosure is stopped.

The respective CONTROL BOARDs 210 are connected to the respective switches 223 in the respective power supply section 220 via the signal line P2. The respective CONTROL BOARDs 210 are able to individually open and close the respective switches 223. Further, the respective CONTROL BOARDs 210 are also connected to the respective cooling fans 202 via the signal line P3. The respective CONTROL BOARDs 210 is able to start or stop the operation of the respective cooling fans 202 or regulate the speed thereof.

Figure 13:
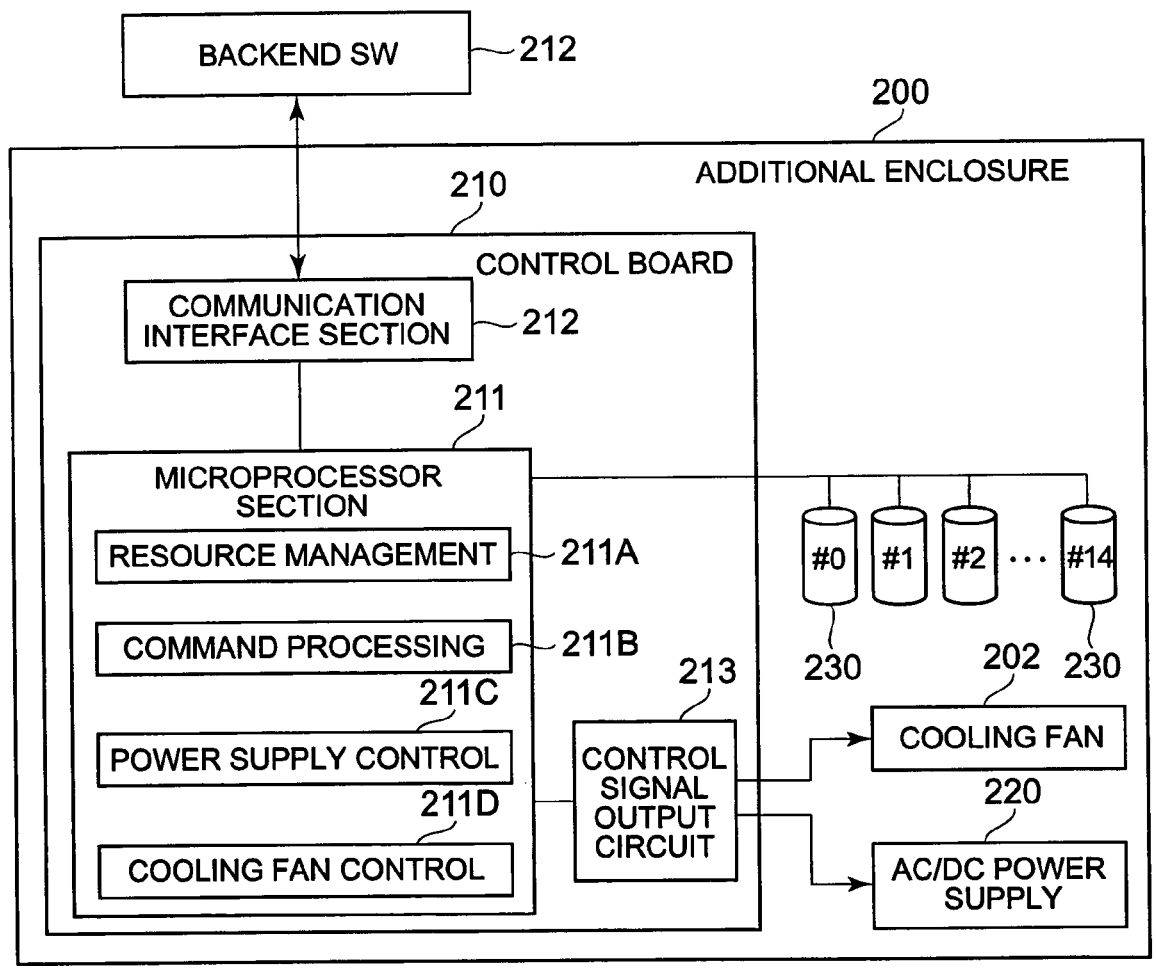
FIG. 13 is an explanatory diagram showing the constitution of the CONTROL BOARD.

FIG. 13 is an explanatory diagram of the constitution that considers one CONTROL BOARD 210. The CONTROL BOARD 210 is constituted comprising, for example, a microprocessor section 211, a communication interface section 212, and a control signal output circuit 213.

The microprocessor section 211 controls the operation of the CONTROL BOARD 210 and implements a resource management function 211A, a command processing function 211B, a power supply control function 211C, and a cooling fan control function 211D, for example.

The resource management function 211A is a function for managing the disposition and states and so forth of the respective resources in the additional enclosure 200 (the disk drives 230, power supply section 220 and so forth), for example. The command processing function 211B is a function for executing instructions that are input by the controller 110. In other words, the command processing function 211B writes data to a designated address of the designated disk drive 230 when the writing of data is requested by the controller 110. Further, the command processing function 211B reads data of the designated length from the designated address of the designated disk drive 230 when the reading of data is requested by the controller 110 and transfers the data of the designated length to the controller 110.

The power supply control function 211C is a function for controlling the output of the power supply section 220 by opening and closing the switch 223 on the basis of an instruction from the controller 110. The cooling fan control function 211D is a function for controlling the operation of the cooling fan 202 on the basis of an instruction from the controller 110.

The communication interface section 212 communicates with the base enclosure 100 via the backend switch 400. The commands and data output by the controller 110 of the base enclosure 100 are input to the communication interface section 212 via the backend switch 400.

FIG. 14 is an explanatory diagram that shows the constitution of a Table T1 for managing the logical volumes 250. This Table T1 constitutes system constitution information together with the power supply state management table T2 shown in FIG. 13. These respective tables T1 and T2 are stored in the cache memory 114, for example.

The volume management table T1 associates and manages items such as volume number (LU#) I11, capacity I12, RAID group number I13, RAID level I14, drive number list I15, and the latest access time I16, for example. Further, the constitution may be such that items other than those in FIG. 14 are managed. The constitution may also be one in which Table T1 is divided up into a plurality of tables and managed.

The logical volume number I11 is identification information for uniquely specifying all the logical volumes 250 provided in the storage control device. The capacity I12 is information showing the storage capacities of the logical volumes 250. The RAID group number I13 is identification information for uniquely specifying the RAID group 240 in which the logical volume 250 is provided. The RAID level I14 is information indicating the RAID level of the RAID group 240. Examples of RAID levels include, for example, RAID1, RAID5, and RAID6 and so forth. The drive number list I15 is information for specifying the disk drives 230 constituting the RAID group 240. The newest access time I16 is information indicating the time the host 13 finally accesses the logical volume 250. Further, although not shown due to the space constraints of the page, the access frequency for each predetermined period and the spare capacity of the respective logical volumes 250 can also be managed by the Table T1, for example.

FIG. 15 is an explanatory diagram that shows a Table T2 for managing the supply state of the power supplies of the respective enclosures 100 and 200. The power supply state management table T2 associates and manages the enclosure number I21, the state of the power supply to enclosure I22, the drive number I23, the spin state I24, the switch (abbreviated to 'SW' in FIG. 15) number I25 of the first channel PDB, the switch state I26, the switch number I27 of the second channel PDB, and the switch state I28 for example. Table T2 is management information for managing the respective states of the respective disk drives 230 and can also be called a 'state management map', for example.

The enclosure number I21 is identification information for uniquely specifying the respective enclosures 100 and 200 that constitute the storage control device. The state of the power supply to enclosure I22 is information indicating whether power from the outside is being supplied to the enclosure. The drive number I23 is identification information for specifying the respective disk drives 230 provided in the enclosure.

The spin state I24 is information indicating whether a disk drive 230 is spinning up or spinning down. The spin state I24 is shown as 'ON' in the case of a spin-up state and shown as 'OFF' in the case of a spin-off state. A spin-up state is a state where the disk is rotating at a predetermined speed and data can be read or written therefrom or thereto. A spin-down state is a state where the disk is rotating at a speed equal to or less than the predetermined speed or has stopped; data cannot be read or written from or to the disk in this state.

The switch number I25 of the first channel and the switch number I27 of the second channel PDB are information for specifying the switches 310 in the PDB of the first power supply channel (channel #0) and the second power supply channel (channel #1) which are connected to the enclosure. The switch states I26 and I28 are information indicating the open and closed states of the switches 310 specified by I25 and I27. The switch states I26 and I28 are shown as 'ON' in cases where switches 310 are closed and shown as 'OFF' in cases where the switches 310 are open. In this embodiment, in order to increase reliability, the switches 310 are constituted as connection points a which are always open.

Figure 16:
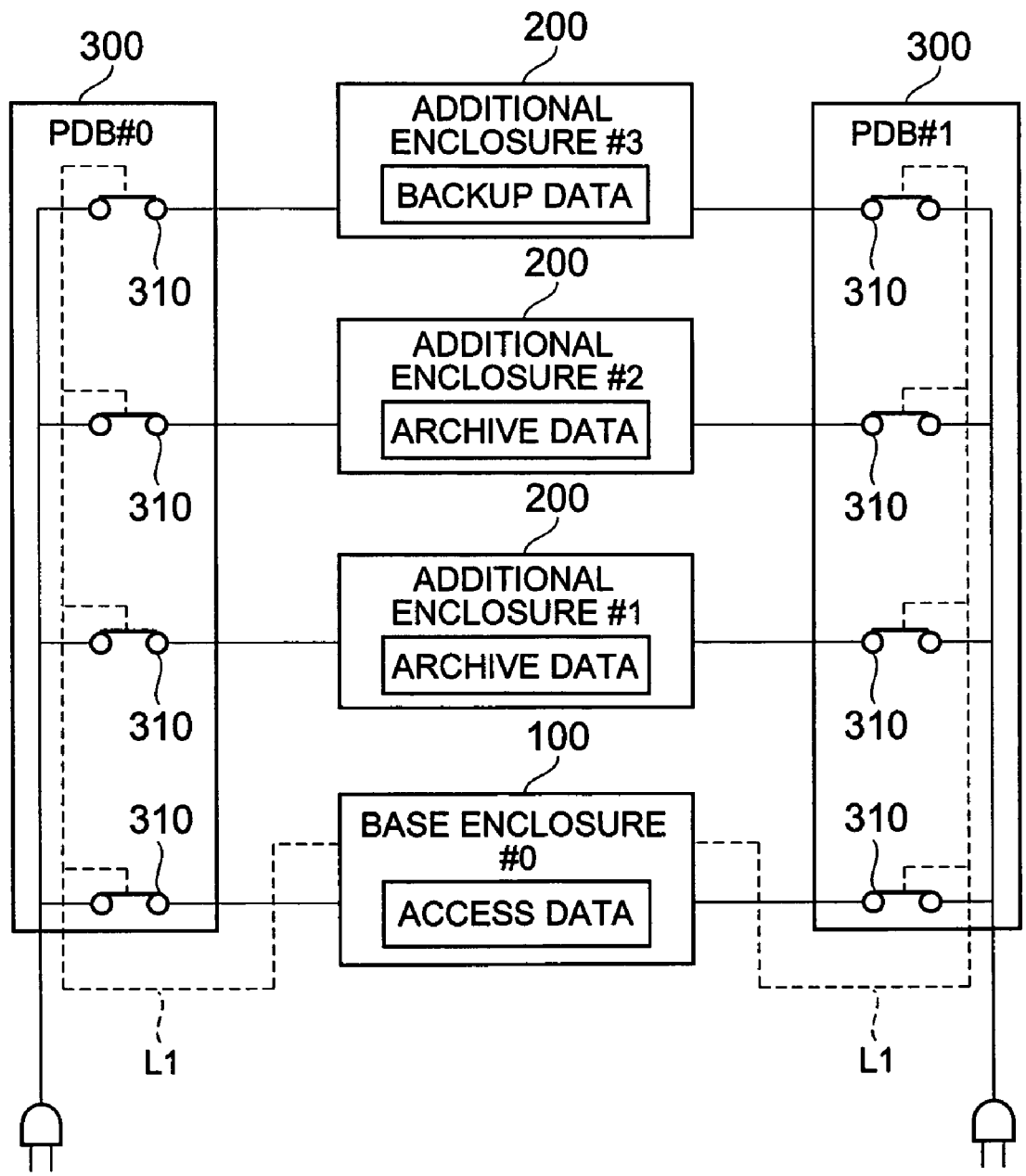
FIG. 16 is an explanatory diagram showing an aspect in which data are re-arranged in accordance with the properties of a disk drive.

FIG. 16 is an explanatory diagram showing an aspect of a case where data are disposed in accordance with the quality of the respective additional enclosures 200. The respective additional enclosures 200 contain disk drives 230 of the same type such as FC drives or SATA drives. Data can be arranged as shown in FIG. 16 in accordance with the performance of the disk drives 230 of the respective additional enclosures 200. For example, data which is frequently accessed by the host 13 (access data in FIG. 16) can be stored in the base enclosure 100 that comprises high-performance disk drives 230 while data that is accessed infrequently by the host 13 or backup data can be stored in an additional enclosure 200 that comprises low-performance disk drives 230. By gathering archive data that is accessed infrequently and backup data in a specified enclosure 200, the time taken to supply power to the enclosure 200 can be shortened and the power consumption amount of the storage control device can be reduced.

Figure 17:
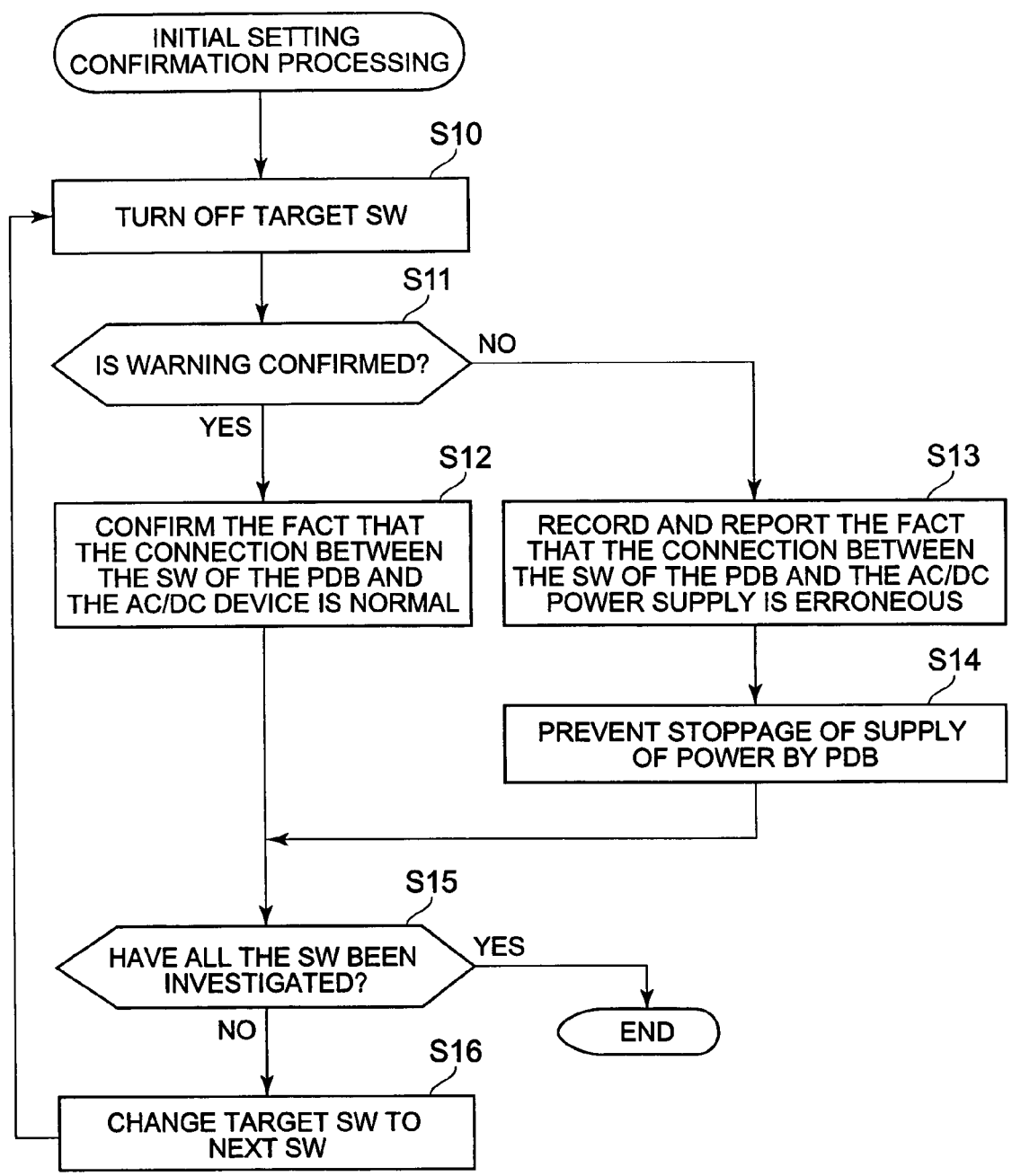
FIG. 17 is a flowchart showing processing for confirming the connection of the power supply.

FIG. 17 is a flowchart showing the processing for confirming the initial settings of the connection constitution for the supply of power. The user is able to determine which switch 310 of which PDB300 is connected to a particular enclosure. The user is able to register the constitution relating to their own connections in Table T2 of the controller 110 via the management terminal 14. However, it is difficult to completely remove human error. Hence, by executing the processing shown in FIG. 17, it is possible to investigate whether the power supply connection constitution registered by the user is correct.

This processing is performed separately for the first power supply channel and the second power supply channel. The controller 110 outputs a control signal to the switch 310 under investigation in order to turn off the switch 310 (S10). The controller 110 confirms whether a warning signal indicating an outage has been output by the power supply section 220 that is supposed to be connected to the switch 310 that was set to OFF in S10 (S11). The respective power supply sections 120 and 220 are constituted capable of outputting a warning signal to the outside in cases where the supply of power from the outside has been suspended.

In cases where a warning signal has been output by the power supply section 220 that is supposed to be connected to the switch 310 that was set to OFF in S11 (S11:YES), the controller 110 judges that information registered by the user is correct (S12). In contrast, in cases where warning information has not been output by the power supply section 220 that is supposed to be connected to the switch 310 that was set to OFF in S11 (S11:NO), the controller 110 judges that the information registered by the user is erroneous (S13). Measures are taken so that, in cases where an error has been detected in the information registered by the user, the supply of power is not stopped by the PDB300 (S14).

The controller 110 judges whether a judgment with respect to the connection state has been performed for all the switches 310 (S15). In cases where an unjudged switch 310 exists (S15:NO), the controller 110 changes the switch under investigation to the next switch 310 (S16) and repeats S10 to S15. When scanning is complete for all the switches 310 (S15:YES), the controller 110 ends this processing. Further, as also indicated in S14, when an error is detected with the connection state, the switch operation at least with respect to the point where an erroneous connection exists is not carried out. In cases where an error with a power-supply related connection is detected, stoppage of the power supply of the PDB300 can be prohibited while the error is being corrected.

Figure 18:
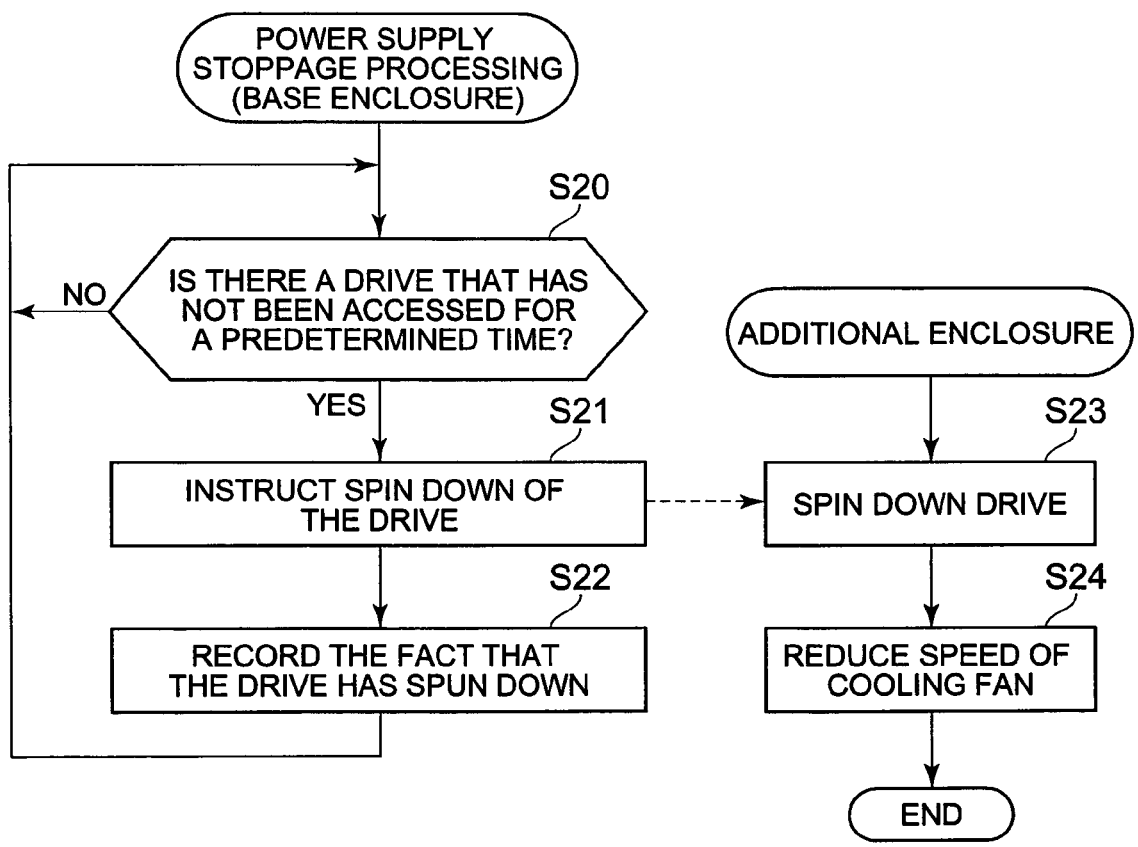
FIG. 18 is a flowchart showing processing for conserving power for each drive.

FIG. 18 is a flowchart showing power supply stoppage processing of one mode. In this processing, power savings are realized for each of the disk drives 230. This processing is an example of mode F1 that appeared in FIG. 1.

Controller 110 judges whether a disk drive 230 that has not been accessed for a predetermined time or more exists by referencing Table T1 (S20). The user is able to make settings by taking an optional value such as one hour as the predetermined time, for example.

In cases where the controller 110 has detected a disk drive 230 that has not been accessed for a predetermined time or more (S20:YES), the controller 110 issues an instruction for changing the disk drive 230 to a spin-down state to an additional enclosure 200 that exists in the disk drive 230 (S21). The controller 110 records the spin state of the detected disk drive 230 detected in S20 in Table T2 as a spin-off state (S22). The instruction (command) issued by the controller 110 is transmitted to the target additional enclosure 200 via the backend switch 400.

The CONTROL BOARD 210 of the additional enclosure 200 that has received the instruction from the controller 110 then spins down the designated disk drive 230 (S23). Further, the CONTROL BOARD 210 reduces the speed of the cooling fan 202 if possible (S24).

For example, in cases where another disk drive 230 is working in the enclosure, the speed of the cooling fan 202 is held at a constant value in order to sustain the temperature within the enclosure. In contrast, as a result of one or a plurality of disk drives 230 being spun down in S23, in cases where the cooling performance can be reduced, the CONTROL BOARD 210 is also able to reduce the speed of the cooling fan 202. Further, it may be determined by the controller 110 whether the speed of the cooling fan 202 is to be reduced. Alternatively, this decision may also be made by the CONTROL BOARD 210 of an additional enclosure 200.

Figure 19:
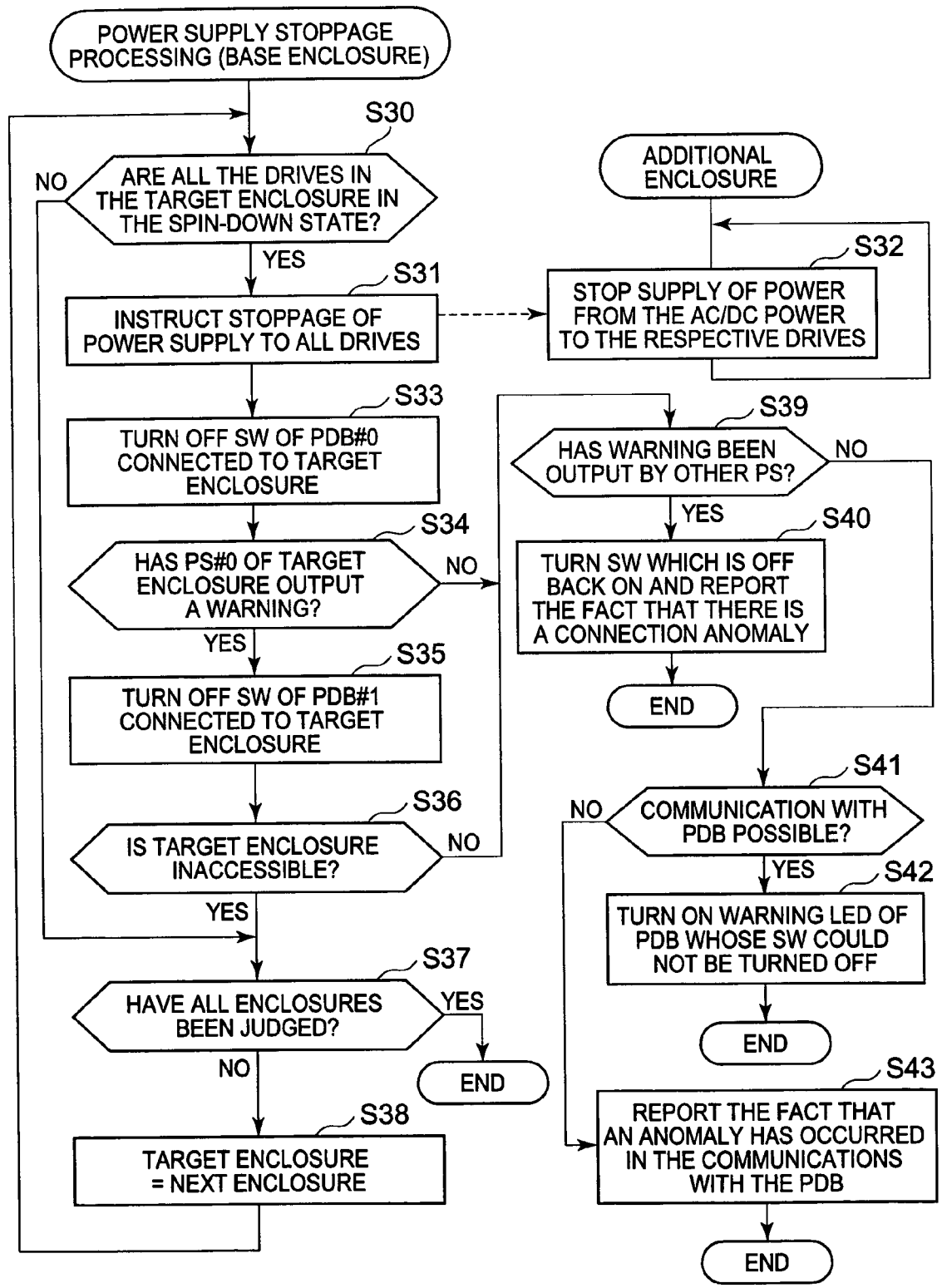
FIG. 19 is a flowchart showing processing for stopping the supply of power to additional enclosures and so forth.

FIG. 19 is a flowchart showing power supply stoppage processing of another mode. In this processing, the stoppage of power to all the disk drives 230 in the enclosure (mode F2 in FIG. 1) and the stoppage of the supply of power to all the enclosures (mode F3 in FIG. 1) are illustrated.

The controller 110 judges whether all of the disk drives 230 in the target enclosure have entered a spin-down state as a result of using Table T2 (S30). As mentioned in FIG. 18, in cases where access to the respective disk drives 230 has not taken place for a predetermined time or more, the respective disk drives 230 are individually placed in a spin-down state. In cases where data access occurs for the disk drives 230 placed in the spin-down state, the disk drives 230 are changed to a spin-up state.

In cases where it is judged that all the disk drives 230 in the target enclosure are in the spin-down state (S30:YES), the controller 110 instructs the CONTROL BOARD 210 of the target enclosure to stop transmitting power to all the disk drives 230 (S31). The CONTROL BOARD 210 of the target enclosure stops the outputs V1 and V2 and stops the transmission of power to all the disk drives 230 in the enclosure by opening the switch 223 in the power supply section 220 (S32). Further, in this case, the controller 110 is able to request not only stoppage of power to all the disk drives 230 but also the stoppage of the cooling fans 202.

In cases where any one or more disk drives 230 among the respective disk drives 230 in the target enclosure are in the spin-up state (S30:NO), the processing moves on to S37.

The controller 110 turns OFF the switch 310 of the PDB300 of the first channel (#0) connected to the target enclosure after issuing an instruction to stop the power to all of the disk drives 230 in the target enclosure (S33). The controller 110 confirms that a warning signal indicating the stoppage of the power supply has been output by the power supply section (PS#0) 220 of the first channel (S34).

In cases where a warning is received from the power supply section 220 of the first channel (S34:YES), the controller 110 turns OFF the switch 310 of the PDB300 of the second channel (#1) connected to the target enclosure (S35). As a result, the supply of power to the target enclosure from the first and second channels is shut off and the target enclosure stops functioning. Thereupon, a warning signal is output from the power supply section 220 of the second channel to the controller 110.

Therefore, the controller 110 confirms that the warning signal from the power supply section 220 of the second channel has been received and confirms that the target enclosure is inaccessible (S36). When it is confirmed that the target enclosure is inaccessible (S36:YES), the controller 110 judges whether all of the enclosures in the storage control device have been judged (S37). In cases where an unjudged enclosure exists (S37:NO), the controller 110 changes the target enclosure to the next enclosure (S38). The controller 110 then repeats S30 to S37.

Cases where a warning signal has not been received in S34 (S34:NO) or the target enclosure has been accessed in S36 (S36:NO) are cases where an anomaly of some kind has occurred. Hence, the controller 110 executes anomaly diagnosis processing (S39 to S43).

The controller 110 judges whether a warning signal has been output by another power supply section 220 other than the scheduled power supply section 220 (S39). When a warning signal has not been output (S39:NO), the controller 110 restores the switch 310 set to OFF in S33 or S35 to ON and issues a warning that an anomaly has occurred with the connection between the PDB300 and the target enclosure (S40). The warning can be displayed on the screen of the management terminal 14. Alternatively, a warning can also be supplied to the user by transmitting an email to the pre-registered user's email address.

When a warning has not been output (S39:NO), the controller 110 judges whether normal communications with the PDB300 provided with an instruction in S33 or S35 are possible (S41). In cases where communications are normally performed (S41:YES), the controller 110 turns ON a warning LED lamp provided in the PDB300 whose target switch 310 has not been turned OFF (S42). Irrespective of whether it is possible for a command to normally be provided by the controller 110, it is possible to judge that a fault has occurred in the PDB300 from cases where the PDB300 is not operating normally.

In contrast, in cases where it is not possible to communicate normally with the PDB300 (S41:NO), the controller 110 judges that a fault has occurred in the communication path (L1) between the PDB300 and controller 110 and outputs a warning (S43). This warning can be displayed on the management terminal 14 or the like as mentioned in S40. This is because it is thought that the cause of the target switch 310 not being turned OFF is not an anomaly within the PDB300 but rather an anomaly that exists on the communication path between the PDB300 and the controller 110.

Figure 20:
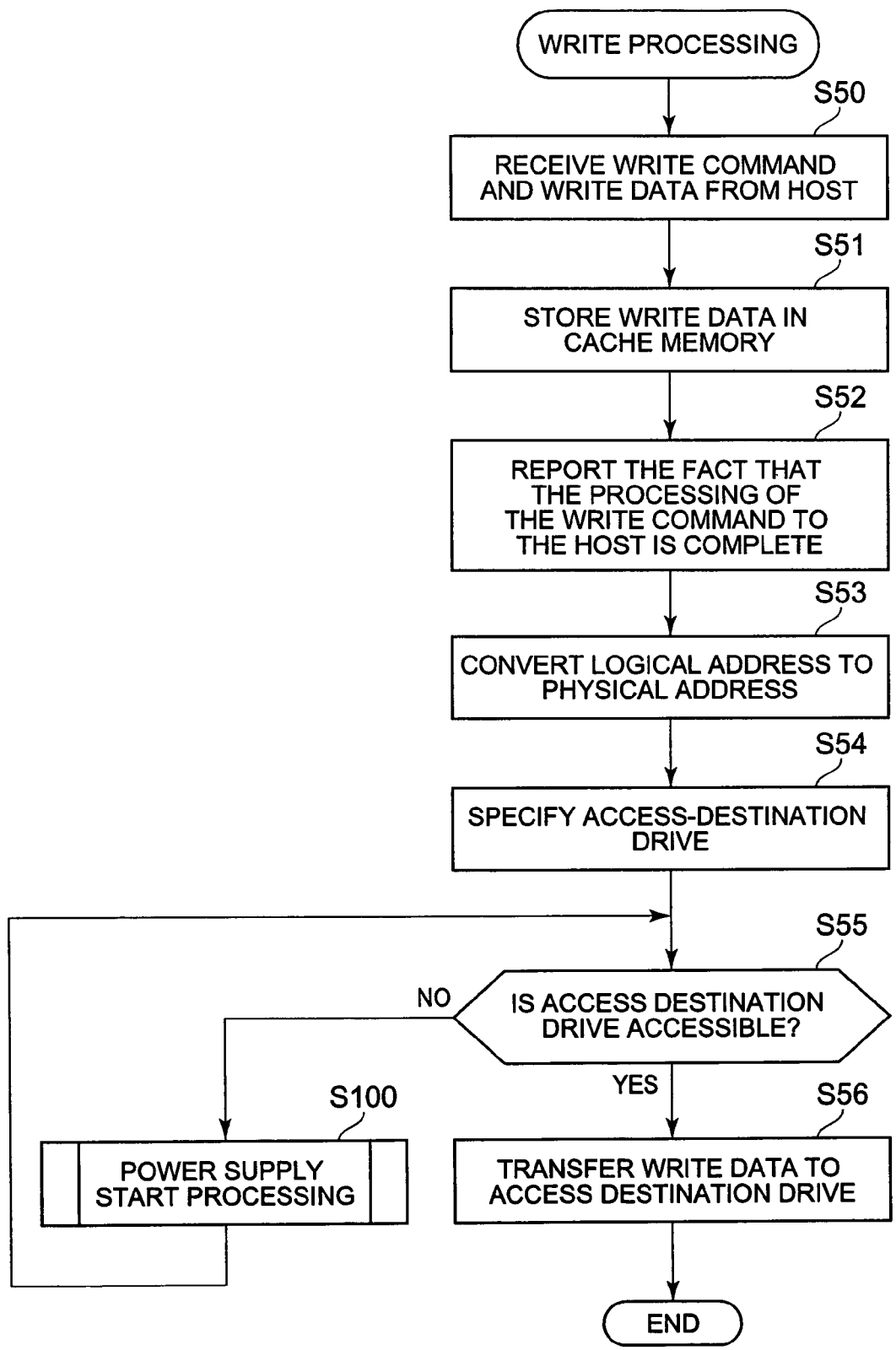
FIG. 20 is a flowchart showing write processing.

FIG. 20 shows a flowchart for processing a write command that is issued by the host 13.

Upon receipt of a read command or write data from the host 13 (S50), the controller 110 stores the write data in the cache memory 114 (S51). The controller 110 communicates the fact that the processing of the write command is complete to the host 13 at the point where the write data are stored in the cache memory 114 (S52). The controller 110 converts the logical address stated in the write command into a physical address of the disk drive 230 (S53) and specifies the access target disk drive 230 (S54). In the following description, there are instances where, for the sake of convenience, the access target disk drive 230 is represented as an access destination drive.

The controller 110 judges whether it is possible to access the access destination drive specified in S54 by using Table T2 (S55). In cases where the access destination drive is in the spin-upstate, it is possible to directly access the access destination drive. In cases where it is judged that it is possible to access the access destination driver (S55:YES), the controller 110 transfers write data to the access destination drive (S56). The write data are transmitted to the additional enclosure 200 having the access destination drive via the backend switch 400. Upon receipt of the write data, the CONTROL BOARD 210 writes write data to the designated disk drive 230 (access destination drive).

In contrast, in cases where it is judged that access to the access destination drive is impossible (S55:NO), the following power supply start processing is executed (S100). Thus, in this embodiment, it is judged whether the access destination drive is accessible before transferring write data to the access destination drive and, in cases where access is impossible, processing to start the supply of power is executed. In contrast, power supply start processing can also be executed in cases where the writing of write data to the access destination drive has not been possible.

Figure 21:
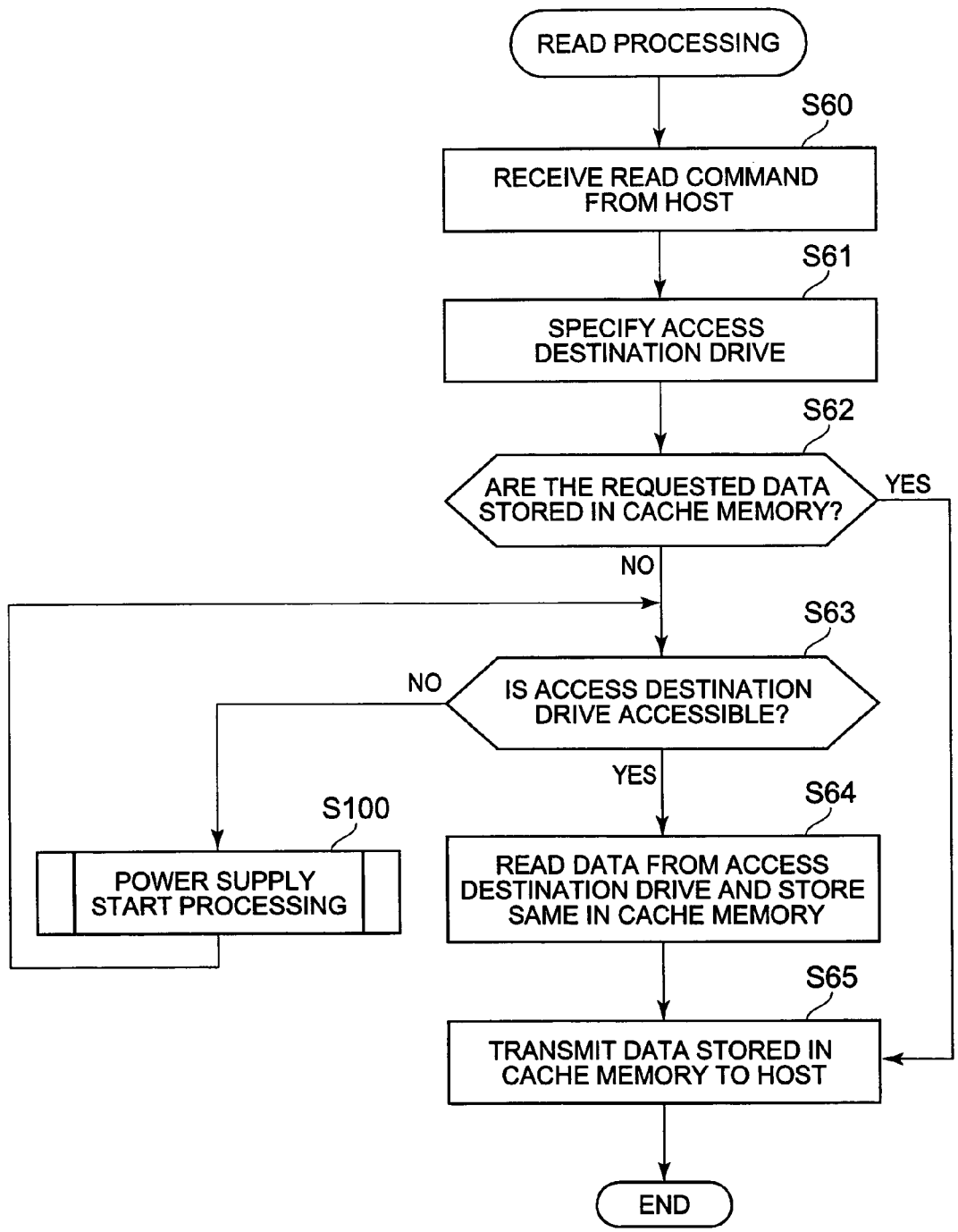
FIG. 21 is a flowchart showing read processing.

FIG. 21 shows a flowchart for processing read commands issued by the host 13. Upon receipt of a read command from the host 13 (S60), the controller 110 specifies an access destination drive (S61). The access destination drive is a disk drive 230 for storing data for which reading has been requested.

The controller 110 judges whether data requested by the host 13 is stored in the cache memory 114 (S62). In the following description, there are instances where data for which reading has been requested by the host 13 are referred to as read data.

In cases where read data are stored in the cache memory 114 (S62:YES), the subsequent steps S63 and S64 are skipped and read data stored in the cache memory 114 are transmitted to the host 13 (S65).

In cases where read data are not stored in the cache memory 114 (S62:NO), the controller 110 judges whether the access destination drive is accessible by using Table T2 (S63). When it is judged that the access destination drive is accessible (S63:YES), the controller 110 reads read data from the access destination drive and stores the read data in the cache memory 114 (S64). The controller 110 transmits read data stored in the cache memory 114 to the host 13 (S65).

In contrast, in cases where it is judged that the access destination drive is inaccessible (S63:NO), the controller 110 executes power supply start processing (S100).

Figure 22:
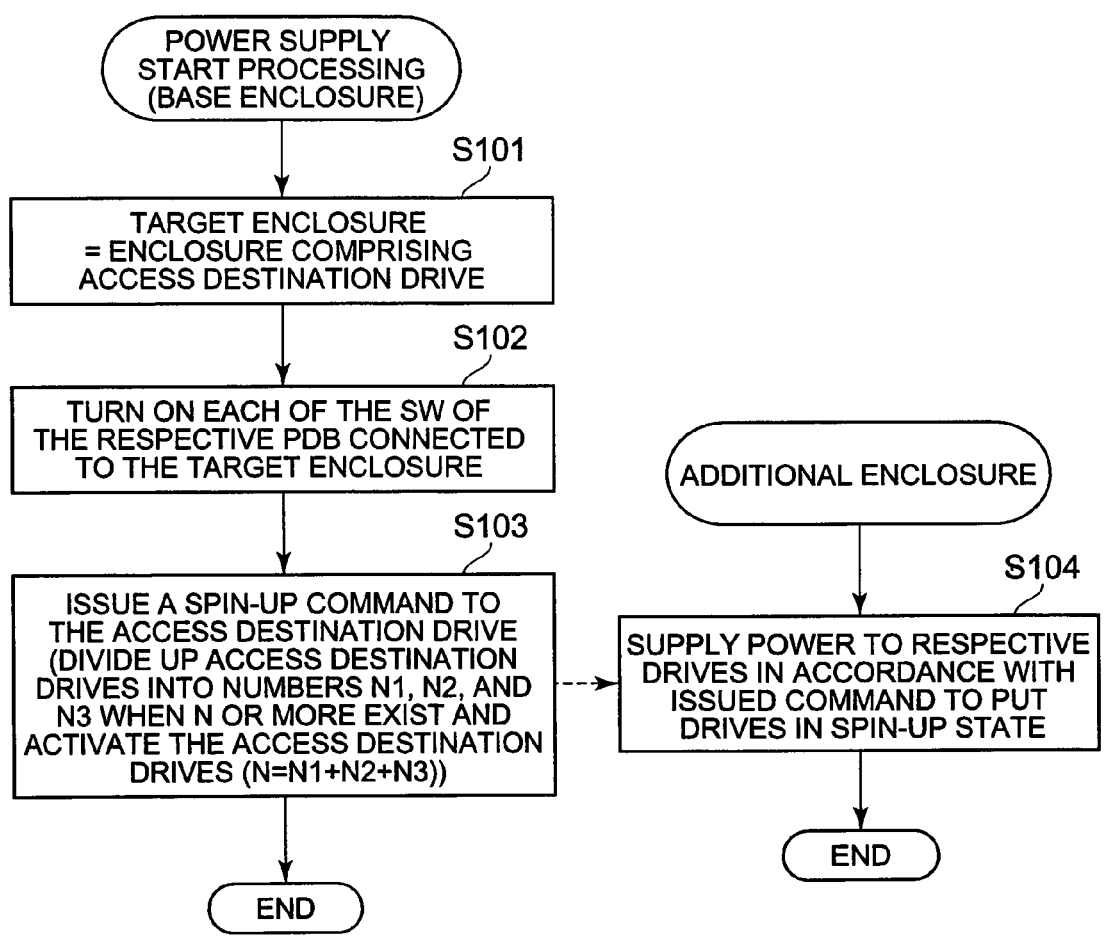
FIG. 22 is a flowchart showing the processing in a case where the power supply is started.

FIG. 22 is a flowchart showing the details of power supply start processing (S100). The controller 110 sets the number of the additional enclosure 200 comprising the access destination drive as the number of the target enclosure (S101).

The controller 110 sets each of the switches 310 in the PDB300 of the respective channels connected to the target enclosure to ON in order to start supplying power to the target enclosure (S102). Thereafter, the controller 110 transmits a command to spin up the access destination drive to the target enclosure. The CONTROL BOARD 210 of the target enclosure activates and spins up the access destination drive in accordance with the command from the controller 110 (S104).

Here, when the number of access destination drives is equal to or more than a predetermined number N that is preset, the controller 110 is also able to divide a total of N access destination drives into three stages which are N1, N2, and N3 and sequentially activate these stages.

Figure 23:
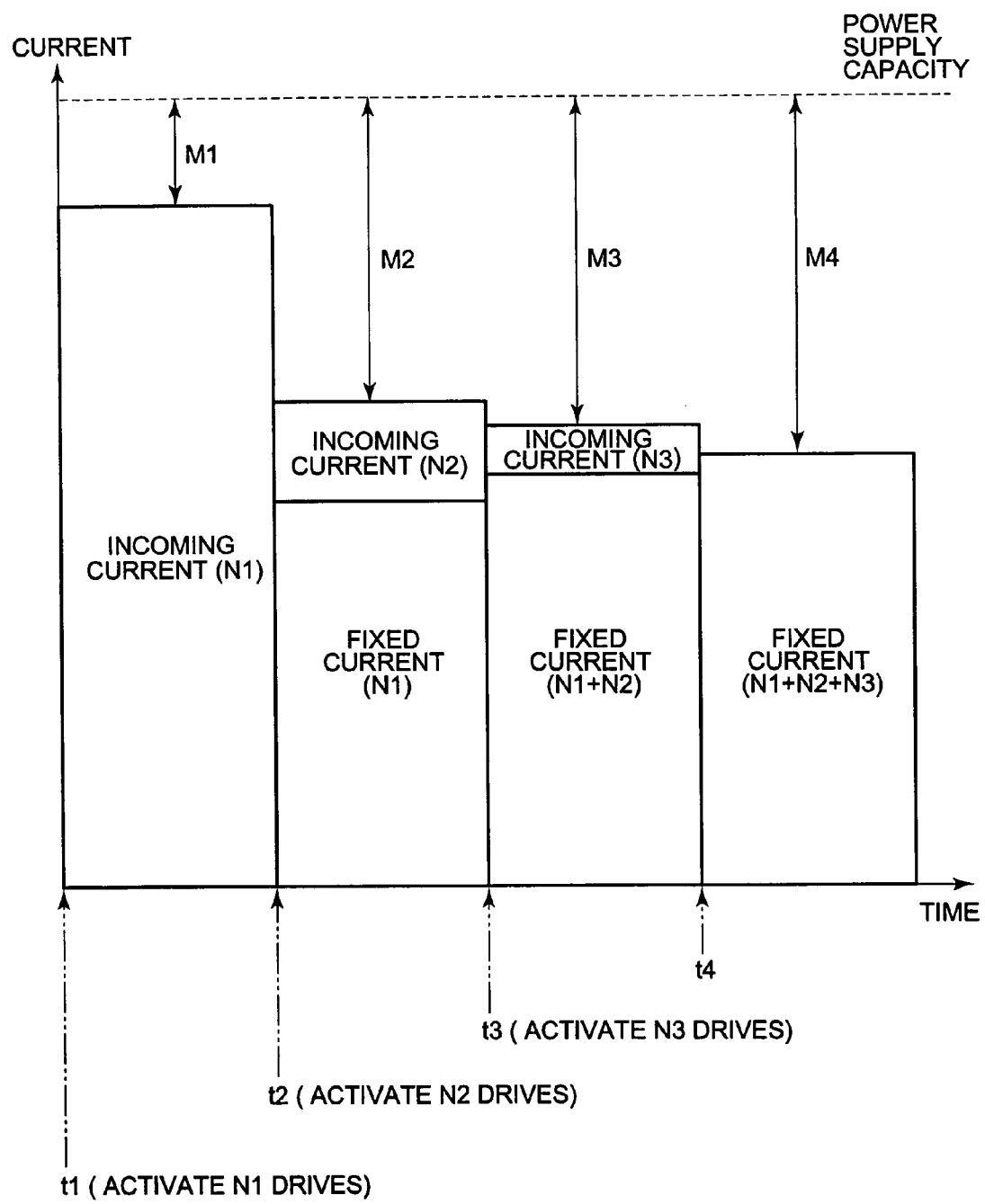
FIG. 23 is an explanatory diagram showing the change in current value in cases where, when a plurality of disk drives are activated, the greatest number of disk drives that can be activated at the same time are activated first and then the remaining disk drives are activated.

FIG. 23 is an explanatory diagram of a change in the value of the current output by the power supply section 220 in cases where N access destination drives are partitioned and sequentially activated. FIG. 23 schematically shows the relationship between the capacitance of the output current of the power supply section 220 and the current consumed by the access destination drive for the sake of a straightforward understanding.

When N1 access destination drives are activated at time t1, an incoming current is momentarily produced. When N2 access destination drives are activated at time t2 at which the incoming current upon activation of the N1 access destination drives disappears, an incoming current is produced. When N3 access destination drives are activated at time t3 at which the incoming current upon activation of the N2 access destination drives disappears, an incoming current is produced and disappears after a short time.

That is, the disk drives 230 are divided up into a plurality and activated so that the incoming current when the access destination drive is activated does not exceed the capacitance of the power supply section 220. M1 to M4 indicate margins for the power supply capacitance. When the spun-up disk drives 230 are accessed, the current consumed by the disk drives 230 increases. Margins M1 to M4 are secured so that the current consumed during access does not exceed the power supply capacitance.

To cite one example, the settings can be made such that N=N1=12. That is, a case where twelve disk drives 230 are activated makes it possible to obtain a sufficient margin M1 even when twelve disk drives 230 are activated at once. When N=15, the settings N1=12, N2=2, and N3=1 can be set. Initially, twelve disk drives 230 are activated, whereupon two disk drives 230 are activated, and finally, one disk drive 230 is activated.

Thus, in cases where disk drives 230 of a predetermined number N or more that is preset are activated, N disk drives 230 can also be divided and activated in a plurality of units N1, N2 and N3 (N1>N2>N3) that are preset. As a result, the consumed current can be controlled so that the power supply capacity of the power supply section 220 is not exceeded and the disk drives 230 can be rapidly spun up. Because a maximum number N1 of disk drives 230 that can be activated at the same time is first activated, it is possible to stabilize the operation of these N1 disk drives 230 at an early stage and immediately access these disk drives.

Figure 24:
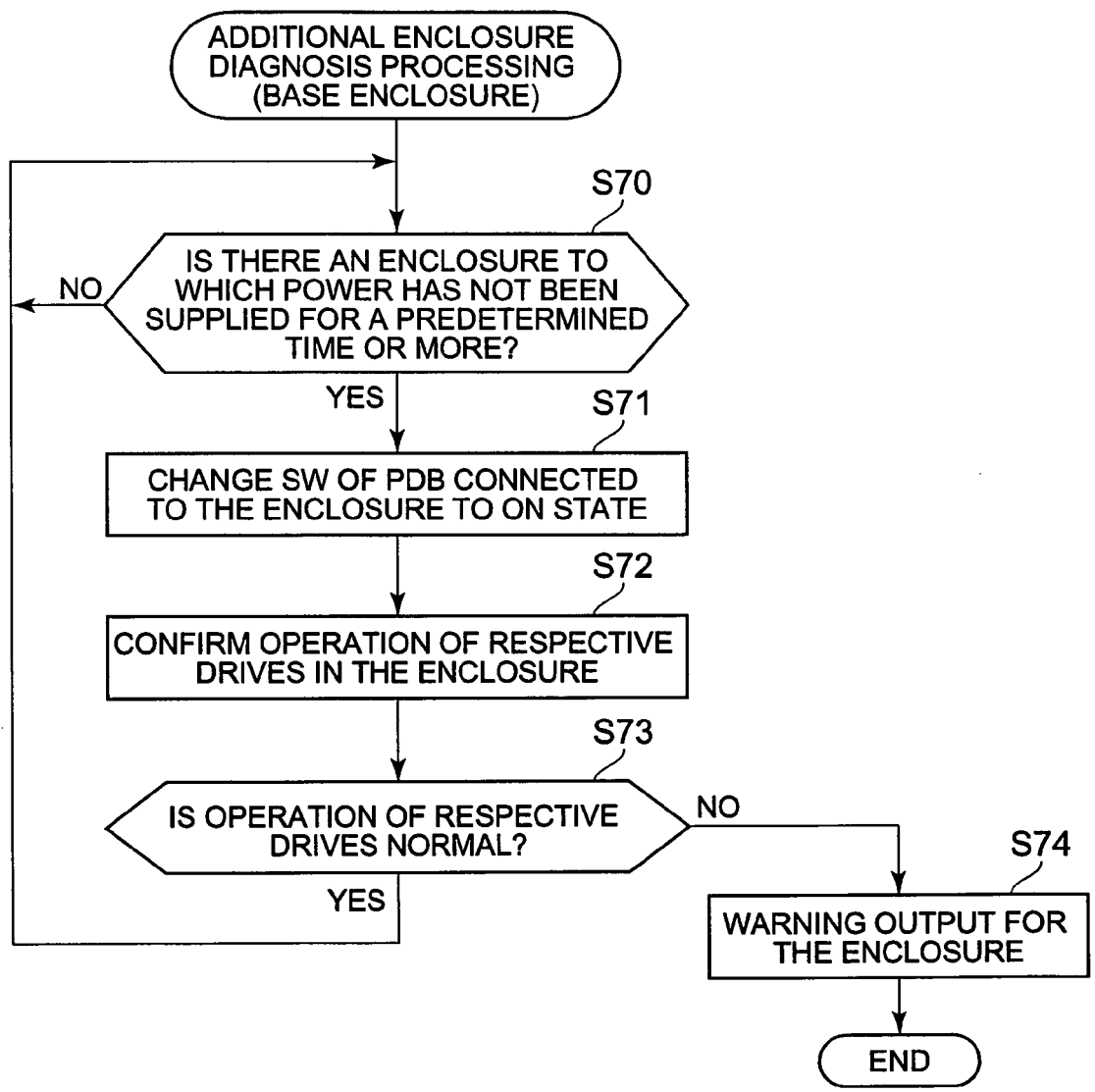
FIG. 24 is a flowchart showing processing to diagnose additional enclosures when the transmission of power has been stopped.

FIG. 24 is a flow chart showing self-diagnosis processing. For example, in cases where power to an additional enclosure 200 that stores data of a low access frequency such as backup data is stopped for a long period, there is the possibility that the production of a fault in the additional enclosure 200 during power stoppage will not be detected and that data will not be obtained when required.

Hence, according to this embodiment, it is confirmed whether the additional enclosure 200 is operating normally by transmitting power to the additional enclosure 200 when same is in a rest condition at regular or irregular intervals. The self-diagnosis processing can be performed at regular intervals in predetermined cycles that are preset or can be performed at irregular intervals that are optionally designated by the user.

The controller 110 uses Table T2 to judge whether an additional enclosure 200 to which external power has not been supplied from the PDB300 for a predetermined time or more is present (S70). When the controller 110 finds an additional enclosure 200 to which power has not been transmitted for a predetermined time or more (S70:YES), the switch 310 in the PDB300 connected to the additional enclosure 200 is turned ON (S71) to supply external power to the additional enclosure 200.

The controller 110 transmits a command that is preset as a diagnosis command (a spin-up command or spin-down command or the like) to the additional enclosure 200 and confirms the operation of the respective disk drives 230 in the additional enclosure 200 (S72). The controller 110 judges whether all the disk drives 230 in the additional enclosure 200 are operating normally (S73). In cases where it is judged that all of the disk drives 230 are operating normally (S73:YES), the controller 110 returns to S70. In cases where any one or more disk drives 230 are not operating normally (S73:NO), the controller 110 outputs a warning to the effect that an anomaly has occurred in the additional enclosure 200 (S74). This warning is communicated to the user via the management terminal 14. Further, when the management terminal 14 is connected to a management server, this warning is transmitted from the management terminal 14 to the management server.

Figure 25:
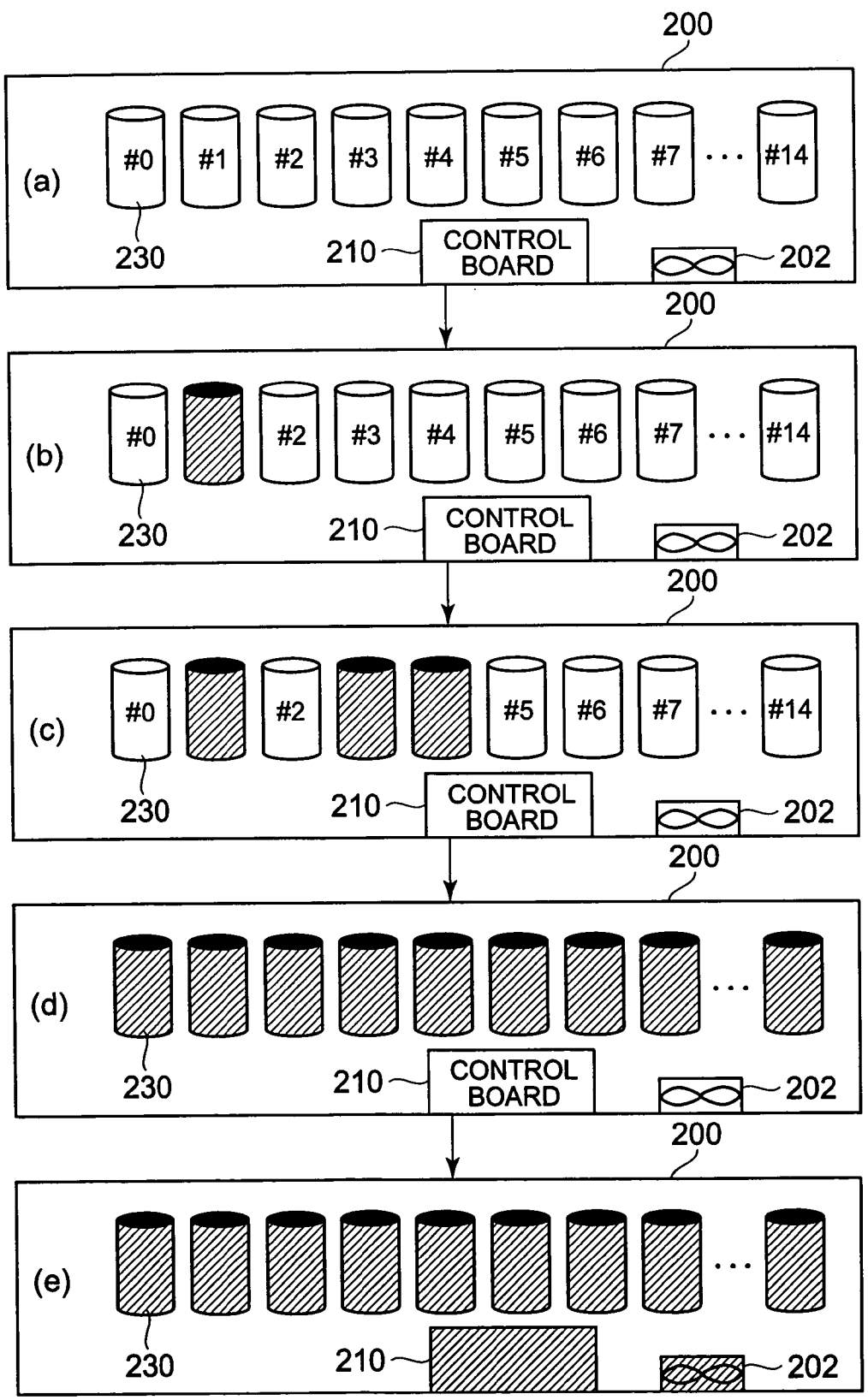
FIG. 25 is an explanatory diagram showing an aspect where sleep mode changes stepwise in accordance with the usage state of the disk drives.

FIG. 25 schematically shows the change in the power savings modes of the respective additional enclosures 200. As shown in FIG. 25A, DC power is first supplied by the power supply sections 220 to the respective disk drives 230, the CONTROL BOARD 210, and the cooling fan 202 respectively. As shown in FIG. 25B, the disk drive 230(#1) that has not been accessed for a predetermined time is changed to a spin-down state.

As shown in FIG. 25C, the disk drives 230 in a spin-down state increase and, when all of the disk drives 230 change to a spin-down state as shown in FIG. 25D, the supply of external power from the PDB300 to the additional enclosures 200 is stopped as shown in FIG. 25E. Thus, in this embodiment, it is possible to curtail the power consumption amount stepwise in accordance with the usage states of the disk drives 230 and, ultimately, bring the power consumption amount to zero.

Figure 26:
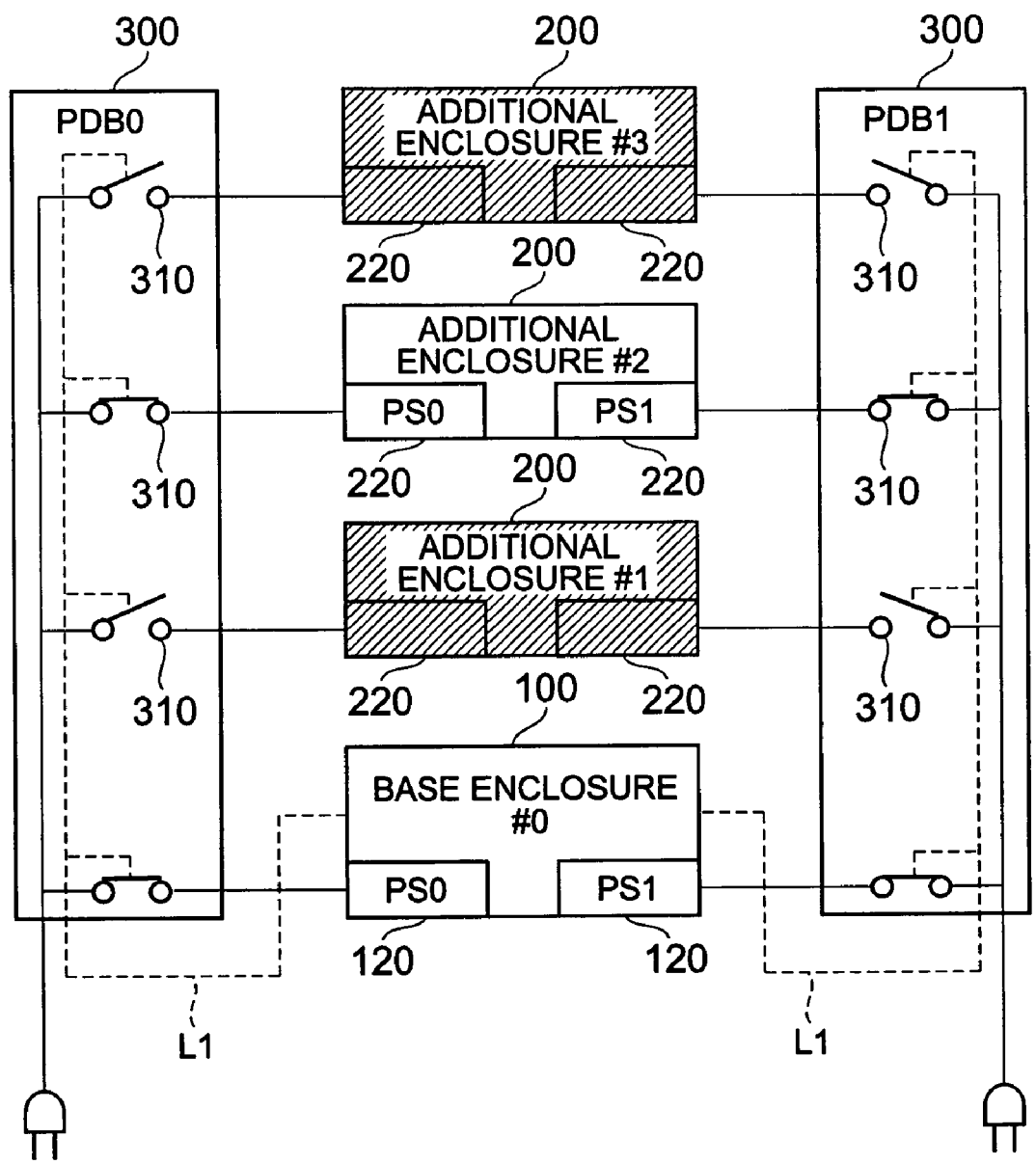
FIG. 26 is an explanatory diagram showing an aspect where an enclosure to which the transmission of power has been completely stopped and an enclosure to which power is being transmitted are integrated in the same storage control device.

FIG. 26 is an explanatory diagram of an aspect in which the power supply is stopped in enclosure units. The supply of power to the enclosures 200 (#1, #3) shown with the oblique lines in FIG. 26 is stopped.

The effect of this embodiment with such a constitution is that, because the supply of external power to the respective additional enclosures 200 is stopped in accordance with the usage states of the disk drives 230, the power consumption amount can be reduced to below the conventional power consumption amount.

In this embodiment, because the base enclosure 100 and respective additional enclosures 200 are switch-connected via the backend switches 400, the base enclosure 100 is able to immediately stop the supply of power gradually upon detection of additional enclosures 200 for which all the contained disk drives 230 are in the spin-down state and the power consumption amount can be reduced. Further effects obtained by the constitution of this embodiment include those already mentioned.

Second Embodiment

The second embodiment of the present invention will now be described on the basis of FIGS. 27 and 28. Each of the following embodiments including this embodiment correspond to modified examples of the first embodiment. With this embodiment, when the PDB300 detects an anomaly with the controller 110, all the switches 310 in the PDB300 are turned ON.

Figure 27:
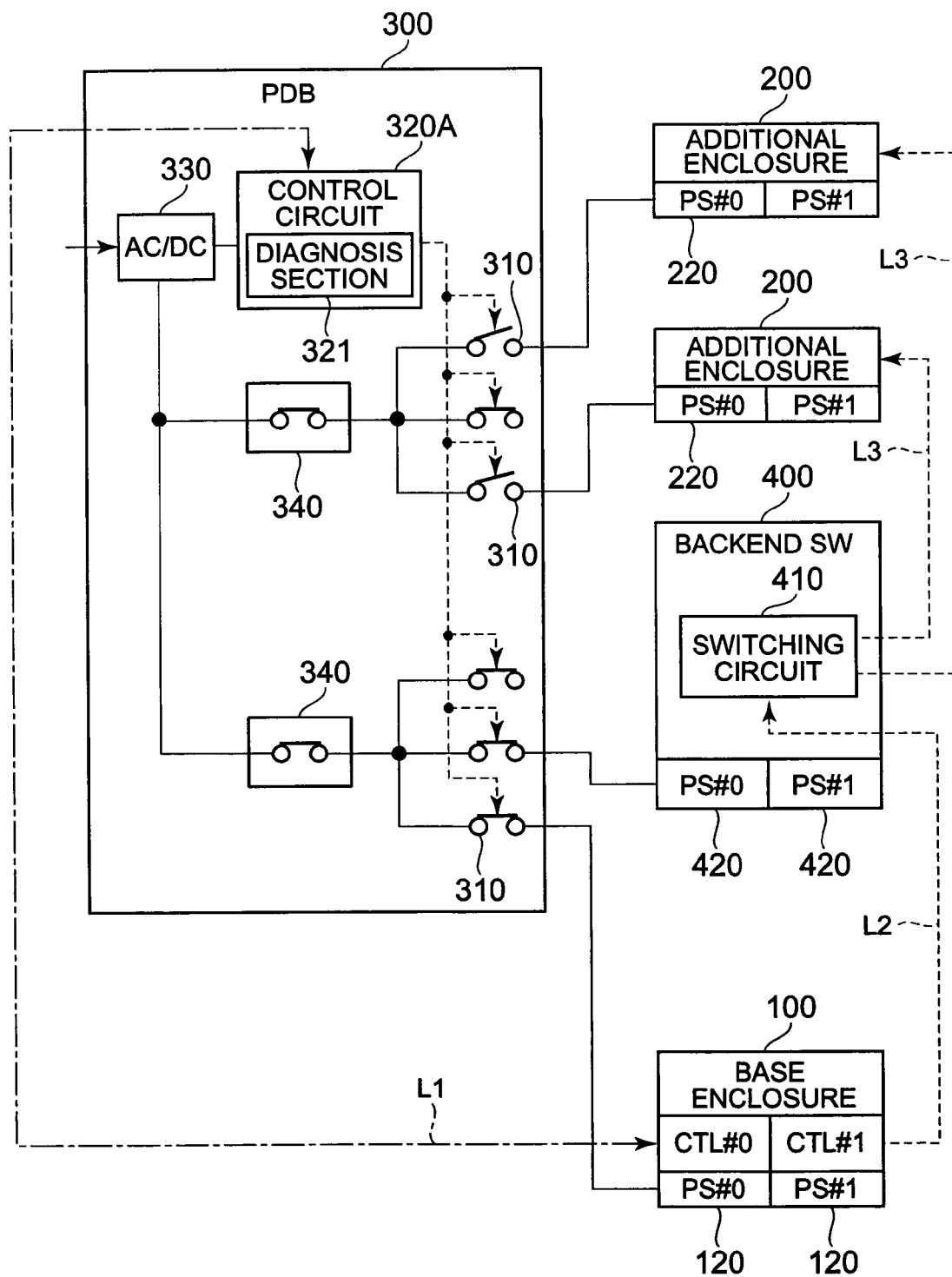
FIG. 27 is a circuit diagram with an emphasis on a portion of the storage control device according to a second embodiment.

FIG. 27 is a circuit diagram with an emphasis on part of the storage control device. A diagnosis section 321 is provided in the control circuit 320A of the PDB300. The diagnosis section 321 performs the following diagnosis processing and controls the respective switches 310 on the basis of the diagnosis results.

Figure 28:
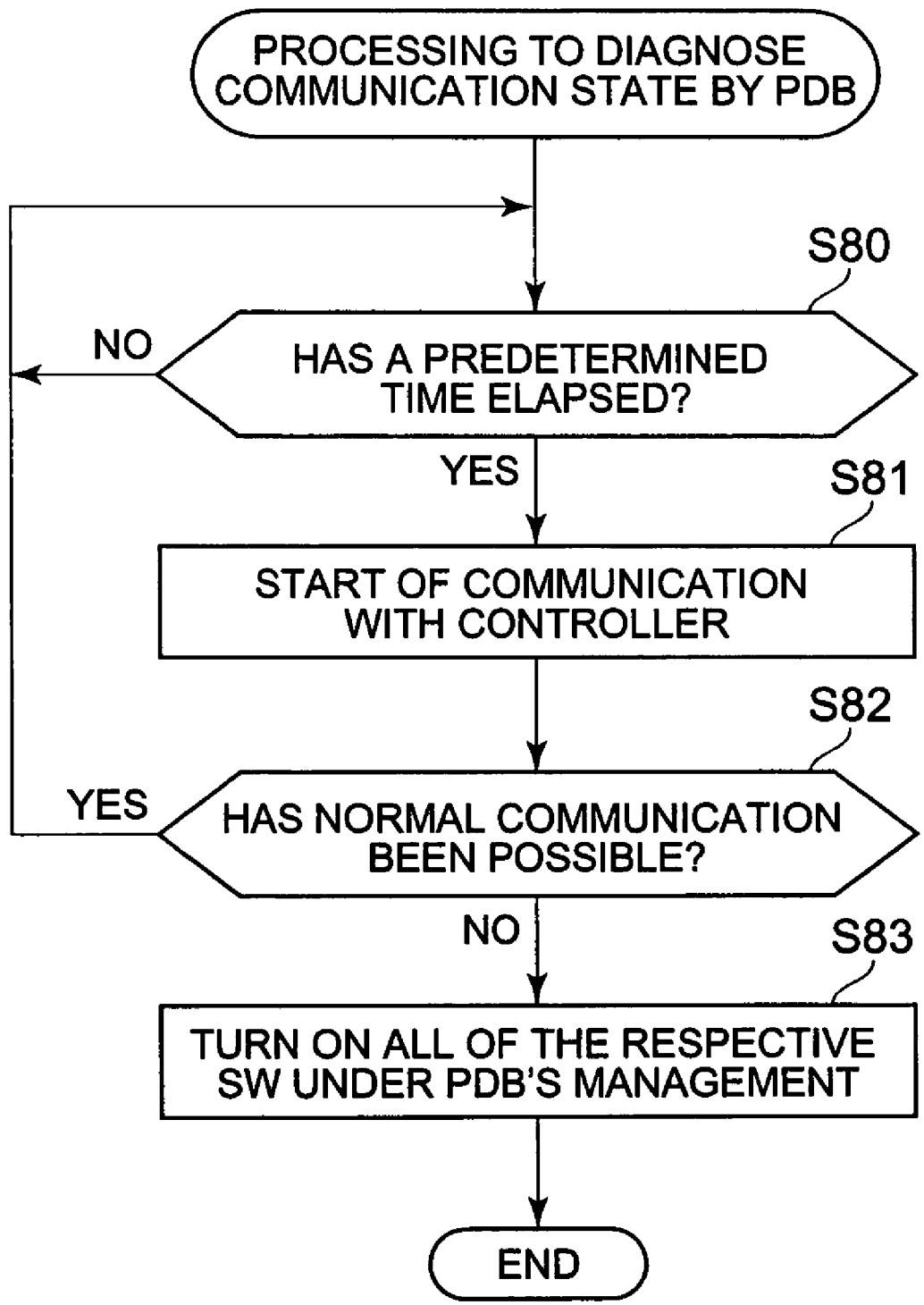
FIG. 28 is a flowchart showing diagnosis processing that is executed by PDB.

FIG. 28 is a flowchart showing the processing that is executed by the diagnosis section 321. The diagnosis section 321 judges whether a predetermined time has elapsed (S80) and, when the predetermined time has elapsed (S80:YES), attempts to communicate with the controller 110 via the signal line L1 (S81).

The diagnosis section 321 in the PDB300 judges whether normal communications with the controller 110 have been possible (S82). When normal communications have been possible (S82:YES), the processing returns to S80, whereupon the diagnosis section 321 again waits until the predetermined time has elapsed.

In contrast, when normal communications have not been possible (S82:NO), the diagnosis section 321 turns ON all of the respective switches 310 in the PDB300 (S83). This is because, when the judgment of S82 yields a 'NO', it may be considered that an anomaly has occurred in the controller 110 and that the controller 110 is unable to suitably turn the switches 310 ON and OFF.

This embodiment which is constituted in this way affords the same effects as those of the first embodiment. In addition, according to this embodiment, when the PDB300 detects an anomaly with the controller 110, because the respective switches 310 are all ON, the stability and reliability improve. Because all the switches 310 are turned ON, the power consumption amount cannot be reduced. However, because the transmission of power to the respective additional enclosures 200 is guaranteed, this is preferable from the perspective of a fail-safe.

Third Embodiment

Figure 29:
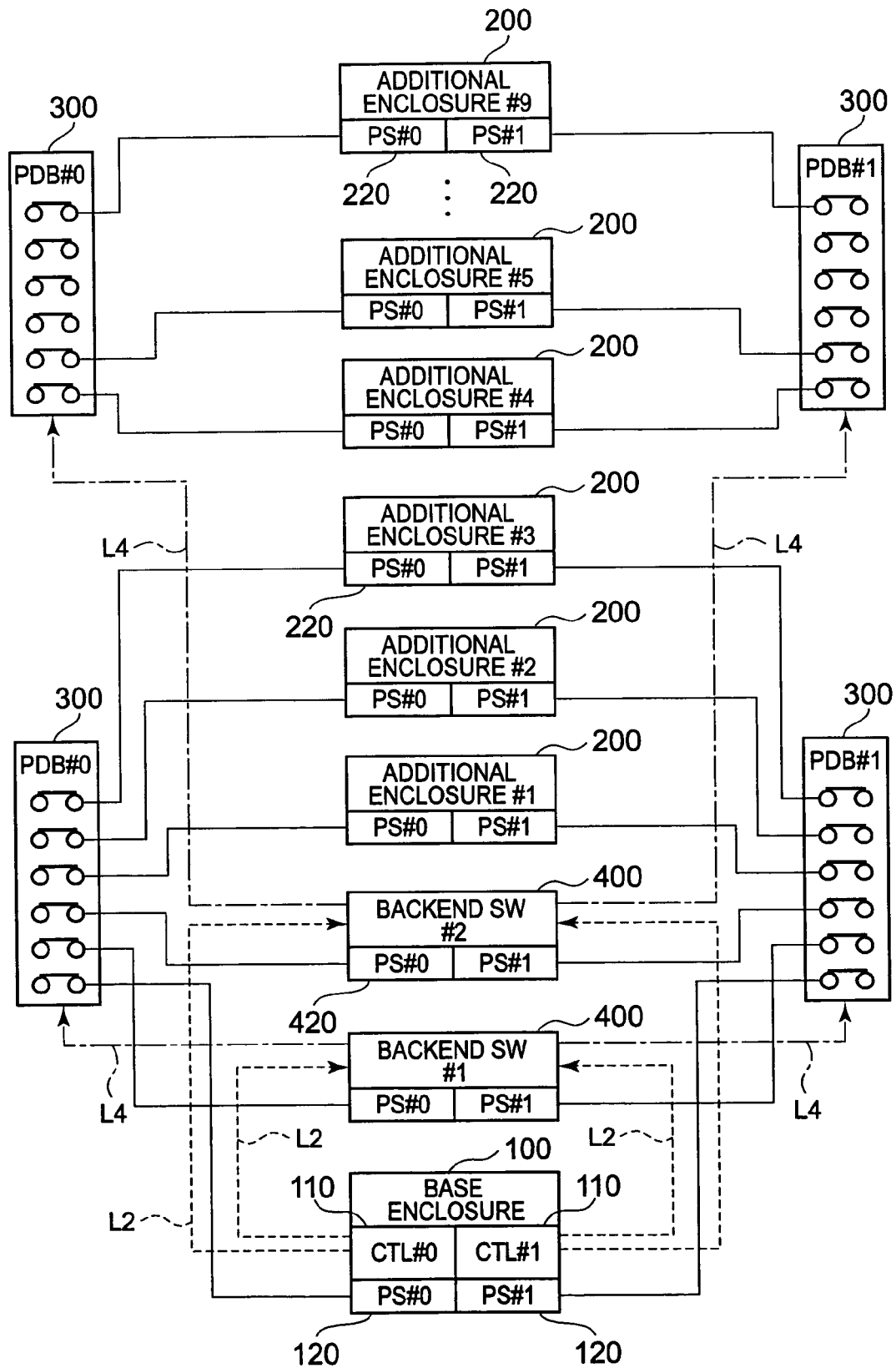
FIG. 29 is an explanatory diagram showing the connection constitution of the storage control device according to a third embodiment.

FIG. 29 is an explanatory diagram that schematically shows the connection constitution of the storage control device according to a third embodiment. In FIG. 29, the signal lines L3 for connecting the backend switches 400 and the respective additional enclosures 200 have been suitably removed. In this embodiment, the base enclosure 100 is connected to the respective PDB300 via the backend switches 400. Hence, in this embodiment, the signal lines L1 are discarded.

Fourth Embodiment

A fourth embodiment will now be described on the basis of FIGS. 30 to 32. In this embodiment, in the case of a storage system that comprises a plurality of storage control devices, one storage control device 1000 virtualizes the storage regions of other storage control devices 1100 and 1200 and supplies these storage regions to the host 13.

Figure 30:
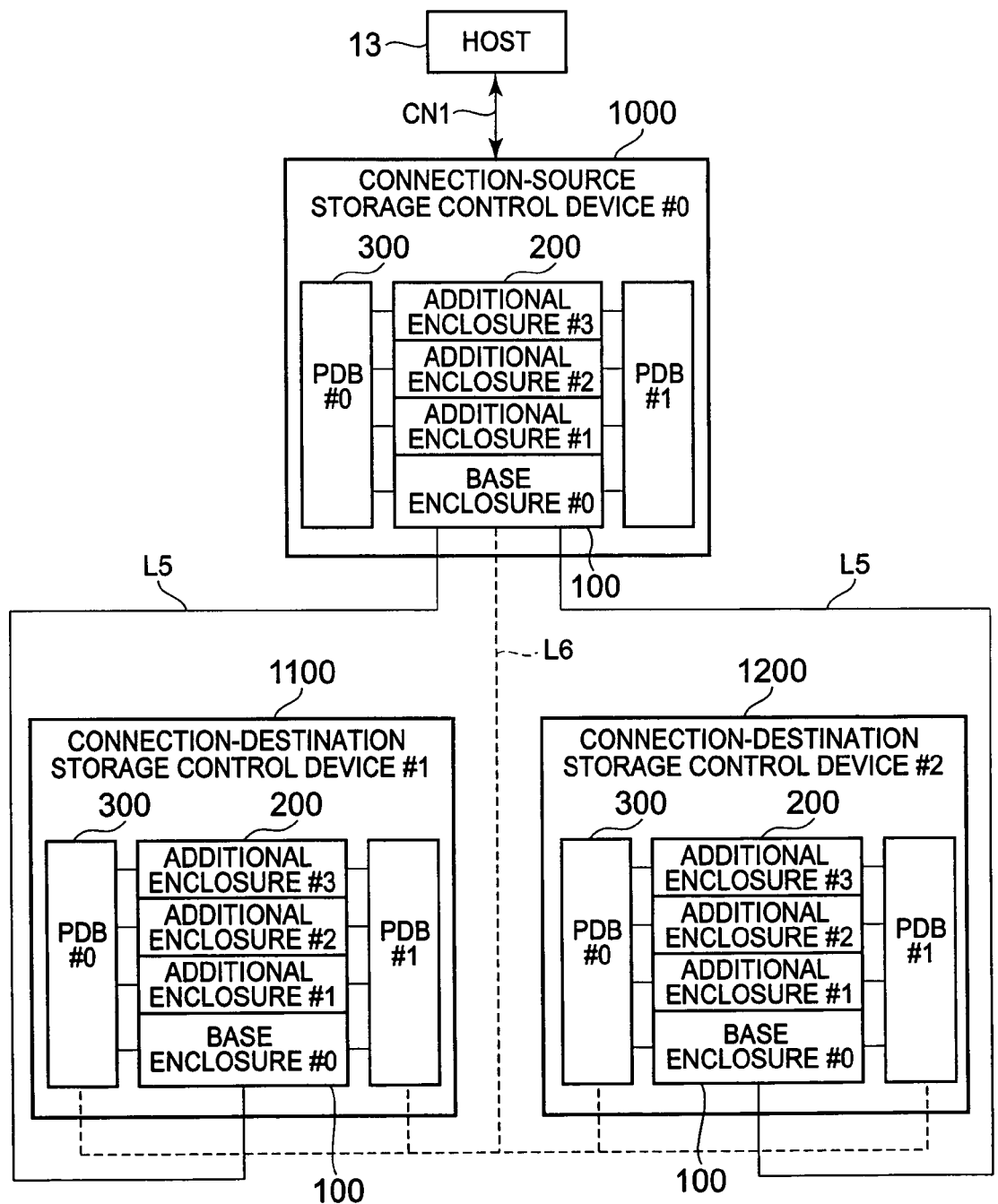
FIG. 30 is an explanatory diagram showing the overall constitution of the storage system used by the storage control device according to a fourth embodiment.

The storage system shown in FIG. 30 comprises a plurality of storage control devices 1000, 1100, and 1200. The storage control device 1000 is a connection-source storage control device which is connected to the respective other storage control devices 1100 and 1200 and manages the other storage control devices 1100 and 1200.

The connection-source storage control device 1000 virtualizes, within the storage control device 1000, the respective storage regions that the connection-destination storage control devices 1100 and 1200 each comprise and provides the host 13 with these storage regions as is same were internal volumes of the storage control device 1000. Therefore, the connection-source storage control device 1000 centrally manages information related to the system constitution of the respective storage control devices 1000, 1100, and 1200.

The respective storage control devices 1000, 1100 and 1200 can be constituted comprising the same basic structure or can each comprise different structures. In this embodiment, the storage control devices 1000, 1100 and 1200 comprise the constitution mentioned in the first embodiment.

The base enclosure 100 of the connection-source storage control device 1000 and the respective base enclosures 100 of the connection-destination storage control devices 1100 and 1200 are connected via a communication line L5. This communication line L5 can be constituted as a communication network such as a SAN, for example. Further, the base enclosure 100 of the connection-destination storage control device 1000 and the respective PDB300 of the respective connection-destination storage control devices 1100 and 1200 are connected via a signal line L6.

Figure 31:
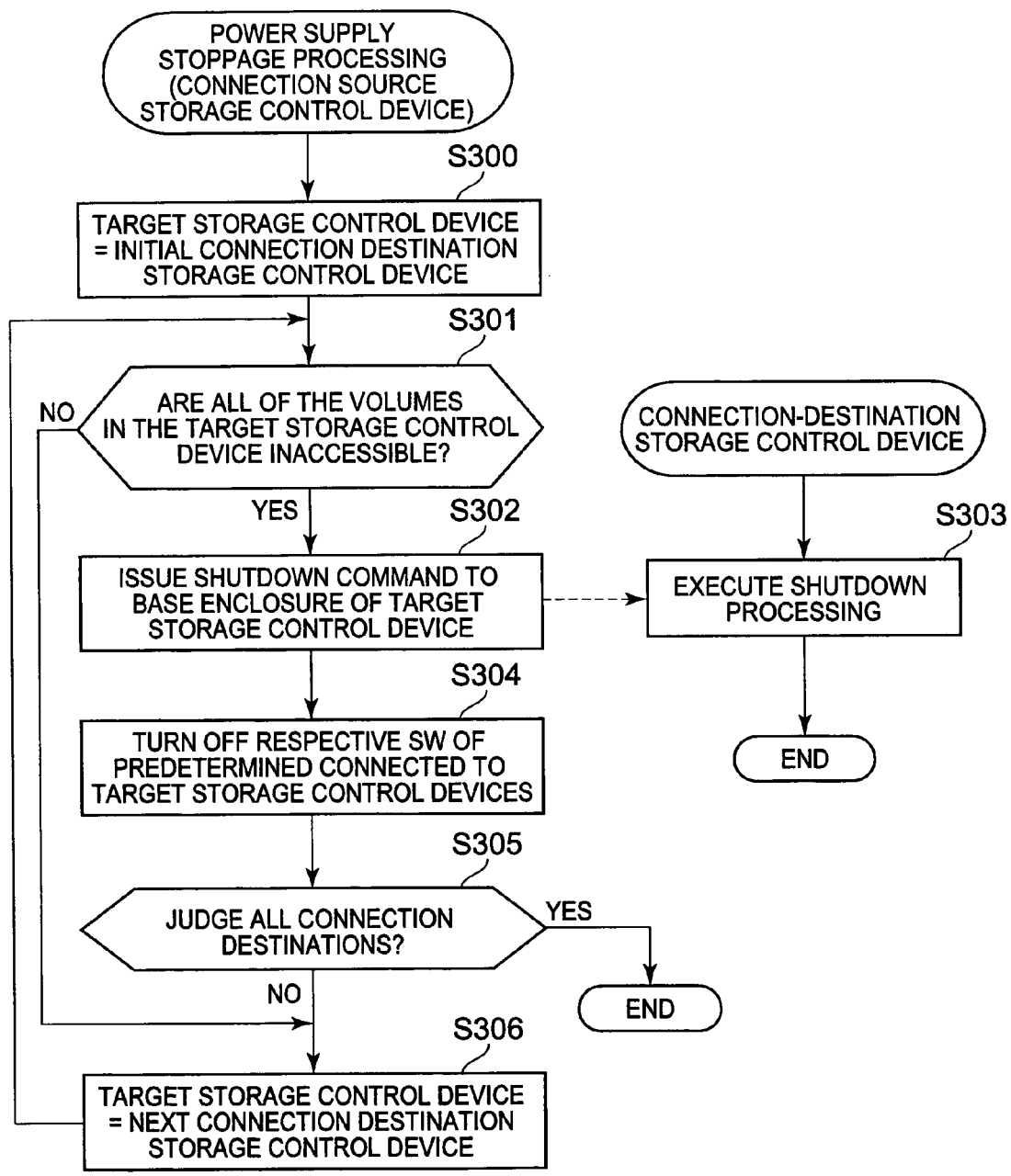
FIG. 31 is a flowchart showing processing to stop the supply of power in storage control device units.

FIG. 31 is a flowchart showing power supply stoppage processing of this embodiment. This processing is executed by the controller 110 in the base enclosure 100 of the connection-source storage control device 1000.

The connection-source controller 110 selects the storage control device 1100 with the smallest device number as the processing target storage control device (S300). The controller 110 judges whether all the volumes 250 of the target storage control device 1100 are inaccessible (S301).

In cases where it is judged that all of the volumes 250 of the storage control device 1100 are inaccessible (S301:YES), the connection-source controller 110 issues a shutdown command to the base enclosure 100 of the storage control device 1100 (S302).

The controller 110 of the storage control device 1100 that has received the shutdown command executes shutdown processing (S303). In the shutdown processing, the supply of power is stopped in sequence starting with the lowest additional enclosures 200, for example, and the operation of the base enclosure 100 is also finally stopped.

The connection-source controller 110 sequentially turns OFF the respective switches 310 in the respective PDB300 connected to the storage control device 1100 started with the lowermost switch 310 (S304). As a result, the supply of external power to the base enclosure 100 and respective additional enclosures 200 of the connection-destination storage control device 1100 is stopped.

The connection-source controller 110 judges whether all of the connection-destination storage control devices have been judged (S305). In cases where an unjudged storage control device exists (S305:NO), the controller 110 changes the device number of the target storage control device to the device number of the next connection-destination storage control device 1200 (S306) and repeats S301 to S305.

Figure 32:
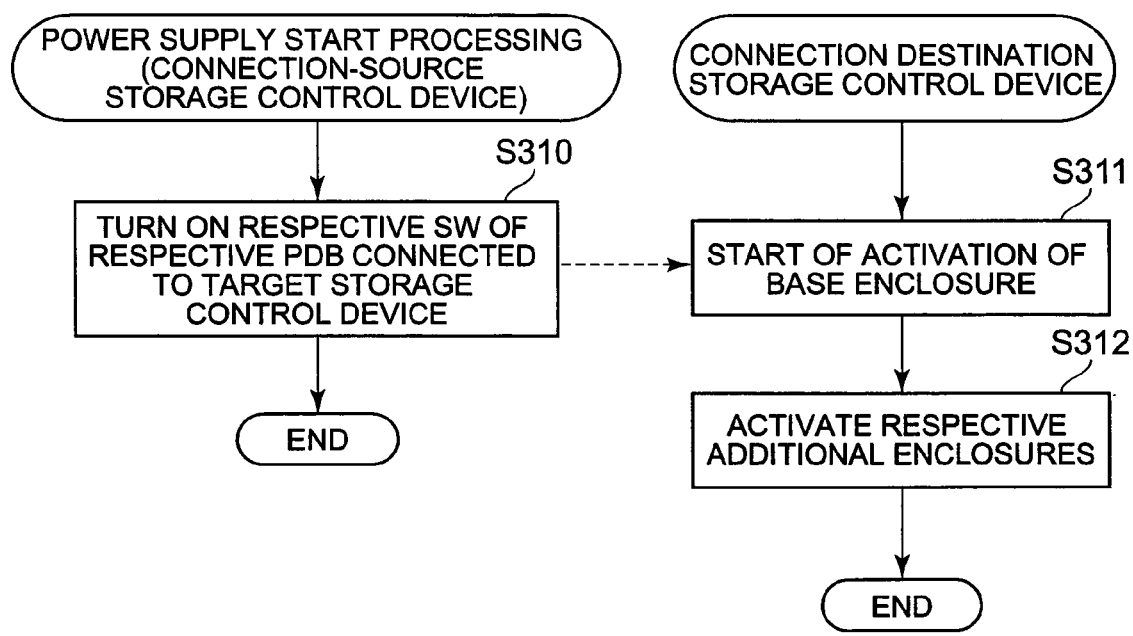
FIG. 32 is a flowchart showing processing to restart the supply of power in storage control device units.

FIG. 32 is a flowchart showing the processing in a case where the power supply is started. The connection-source controller 110 turns ON the respective switches 310 in the respective PDB300 connected to the target storage control device sequentially starting with the highest switch 310 (S310).

In the case of the connection-destination storage control device, when external power is supplied from the PDB300 of each channel, the base enclosure 100 is initially activated (S311) and then the respective additional enclosures 200 are activated in the order in which external power is supplied thereto (S312).

This embodiment which is constituted in this way affords the same effects as those of the first embodiment. In addition, according to this embodiment, a storage system comprising a plurality of the storage control devices 1000, 1100, and 1200 is capable of further curtailing the power consumption amount.

Fifth Embodiment

Figure 33:
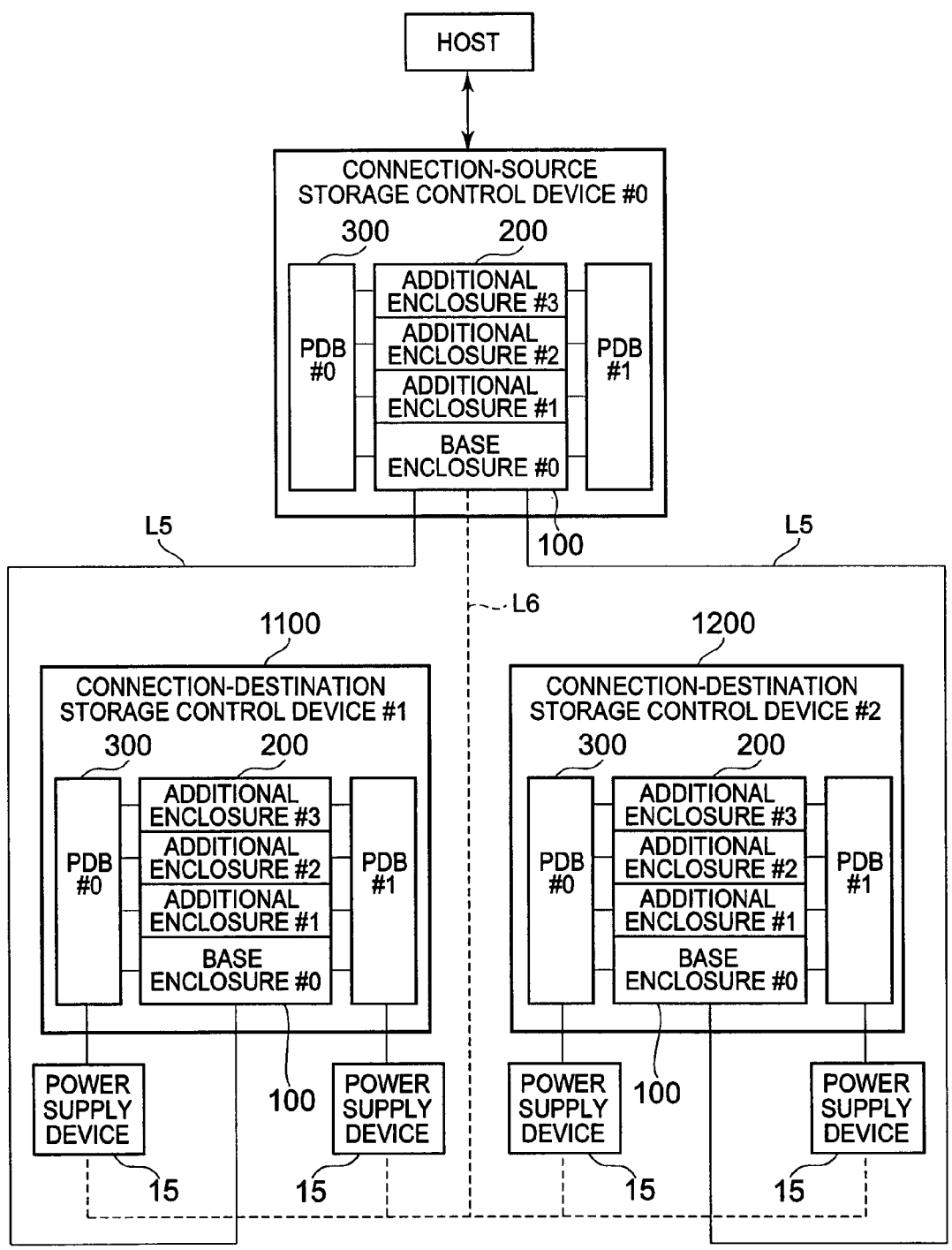
FIG. 33 is an explanatory diagram that shows the overall constitution of the storage system used by the storage control device according to a fifth embodiment.

FIG. 33 is an explanatory diagram of the storage system according to the fifth embodiment. In this embodiment, the operation of the power supply device 15 that supplies power to the respective PDB300 of the respective connection-destination storage control devices 1100 and 1200 is controlled by the base enclosure 100 of the connection-source storage control device 1000.

This embodiment, which is constituted in this way, affords the same effects as those of the fourth embodiment.

The present invention is not limited to the above embodiments. A person skilled in the art is able to make various additions or modifications within the scope of the present invention. The respective embodiments can be suitably integrated, for example.

What is claimed is:

1. A storage control device comprising a plurality of enclosures, wherein
    any one of the enclosures is a first enclosure for controlling data communications with a higher-level device and operation of the other enclosures;
    the other enclosures other than the first enclosure are second enclosures that each comprise a plurality of storage devices;
    the first enclosure and the respective second enclosures are connected via an interenclosure connection section for switch-connecting the first enclosure and the respective second enclosures; and
    the first enclosure holds system constitution information for managing constitution of the storage control device and a power supply state thereof and, by controlling a power supply circuit section for supplying power to each of the second enclosures on the basis of the system constitution information, the supply of power or stoppage of power is controlled individually for each of the second enclosures.

2. The storage control device according to claim 1, wherein the first enclosure shifts to a power savings mode for suppressing power consumption for storage devices that have not been accessed for a preset predetermined time or more among the respective storage devices.

3. The storage control device according to claim 2, wherein, in cases where, among the respective second enclosures, a predetermined second enclosure in which all of the storage devices in the enclosure have shifted to the power savings mode is detected, the first enclosure stops supplying power to all of the storage devices in the predetermined second enclosure.

4. The storage control device according to claim 2, wherein, in cases where, among the respective second enclosures, a predetermined second enclosure in which all of the storage devices in the enclosure have shifted to the power savings mode is detected, the first enclosure stops supplying power to the predetermined second enclosure.

5. The storage control device according to claim 3, wherein the first enclosure stops supplying power to the predetermined second enclosure after stopping the supply of power to all of the storage devices in the predetermined second enclosure.

6. The storage control device according to claim 1, wherein, in cases where occurrence of a fault in the first enclosure is sensed, the power supply circuit section shifts to a state where power is supplied to the respective second enclosures.

7. The storage control device according to claim 4, wherein, in cases where power is again supplied to the predetermined second enclosure, the first enclosure controls the predetermined second enclosure so that the storage devices in the predetermined second enclosure are activated following division of the storage devices into groups by a predetermined number of storage devices.

8. The storage control device according to claim 4, having, as the power supply circuit sections, first and second power supply circuit sections that supply power via different power supply paths to each of the second enclosures, wherein
in cases where the supply of power to the predetermined second enclosure is stopped, the first enclosure controls each of the first and second power supply circuit sections:
(1) first to stop the supply of power from the first power supply circuit section to the predetermined second enclosure;
(2) to confirm that the supply of power from the first power supply circuit section to the predetermined second enclosure has stopped normally;
(3) then to stop the supply of power from the second power supply circuit section to the predetermined second enclosure; and
(4) to confirm that the supply of power from the second power supply circuit section to the predetermined second enclosure has stopped normally.

9. The storage control device according to claim 8, wherein the first enclosure judges whether, in cases where the supply of power from either the first power supply circuit section or the second power supply circuit section to the predetermined second enclosure has not been stopped normally, communication with a predetermined power supply circuit section for which the power supply has not been stopped normally among the first power supply circuit section and the second power supply circuit section is possible and provides an output to the effect that an anomaly has occurred in the predetermined power supply circuit section when communication is possible and provides an output to the effect that an anomaly has occurred in the communication path between the predetermined power supply circuit section and the first enclosure when communication is not possible.

10. The storage control device according to claim 1, wherein the first enclosure and the power supply circuit section are connected via a communication network, and the first enclosure controls the power supply circuit section by transmitting commands to instruct the start of the power supply or stoppage of the power supply to the power supply circuit section via the communication network.

11. The storage control device according to claim 1, wherein
the interenclosure connection section and the power supply circuit section are connected, and
the first enclosure instructs the power supply circuit section to start the power supply or stop the power supply via the interenclosure connection section.

12. The storage control device according to claim 1, wherein the first enclosure diagnoses whether the second enclosure to which the power supply has stopped is operating normally by supplying power thereto at regular or irregular intervals.

13. A storage control device having a plurality of enclosures, comprising:
a first enclosure;
second enclosures having a plurality of storage devices respectively;
a power supply circuit section for supplying external power to the first enclosure and the respective second enclosures; and
an interenclosure connection section for switch-connecting the first enclosure and the respective second enclosures, wherein
the first enclosure comprises at least:
a system constitution information management section for managing system constitution information related to constitution of the storage control device and a power supply state thereof;
a first control section for processing the power supply to the respective second enclosures and data I/O between a higher level device and the respective storage devices on the basis of the system constitution information managed by the system constitution information management section; and
a first enclosure-contained power supply section for supplying predetermined power to the first control section by converting the external power supplied via the power supply circuit section to a predetermined voltage, and wherein
the respective second enclosures comprise at least:
a plurality of the storage devices for storing data to be used by the higher-level device;
a second control section for controlling the data I/O to and from the respective storage devices and operation of a second enclosure-contained power supply section in accordance with instructions from the first control section; and
the second enclosure-contained power supply section for supplying power to the respective storage devices and the second control section by converting the external power supplied via the power supply circuit section to a predetermined voltage, and wherein
the power supply circuit section comprises switch sections that are each provided midway along a power supply path between the respective second enclosure-contained power supply sections and the external power supply, the respective switch sections opening or closing the respective power supply paths in accordance with an instruction from the first control section, and
the first control section closes the power supply path between the second enclosure-contained power supply section of a predetermined second enclosure for which judgment is made, based on the system constitution information, that access to the respective storage devices present in the second enclosure among the respective second enclosures is unnecessary, and the external power supply, by operating the switch section that is connected to the predetermined second enclosure.

14. The storage control device according to claim 13, wherein the first control section is able to execute:
(1) a first mode in which, among the respective storage devices, those that have not been accessed for a preset predetermined time or more are shifted to a power savings mode in which power consumption is suppressed;
(2) a second mode in which, when among the respective second enclosures a predetermined second enclosure in which all of the storage devices in the enclosure have shifted to the power savings mode is detected, the supply of power to all of the storage devices in the predetermined second enclosure is stopped; and (3) a third mode in which the supply of power to the predetermined second enclosure is stopped after stopping the supply of power to all of the storage devices in the predetermined second enclosure.

15. The storage control device according to claim 13, wherein the power supply circuit section detects whether a fault has occurred in the first control section by communicating at regular intervals with the first control section and, in cases where the occurrence of a fault in the first control section is detected, turns ON the respective switch sections to allow power to pass through the respective power supply circuits.

* * * * *